(12) United States Patent
Libert et al.

(10) Patent No.: US 8,985,559 B2
(45) Date of Patent: Mar. 24, 2015

(54) HEAT EXCHANGER PLATE AND A FILL PACK OF HEAT EXCHANGER PLATES

(75) Inventors: Jean-Pierre Libert, Frederick, MD (US); Anthony W. Thurmond, York, PA (US)

(73) Assignee: Evapco, Inc., Westminster, MD (US)

( * ) Notice: Subject to any disclaimer, the term of this patent is extended or adjusted under 35 U.S.C. 154(b) by 658 days.

(21) Appl. No.: 13/342,681

(22) Filed: Jan. 3, 2012

(65) Prior Publication Data

US 2013/0168881 A1      Jul. 4, 2013

(51) Int. Cl.
*B01F 3/04*      (2006.01)

(52) U.S. Cl.
USPC .................................. 261/112.2; 261/DIG. 72

(58) Field of Classification Search
USPC ........................................ 261/112.2, DIG. 72
See application file for complete search history.

(56) References Cited

U.S. PATENT DOCUMENTS

| | | | | |
|---|---|---|---|---|
| 3,281,307 A | * | 10/1966 | Moeller et al. ................. | 428/179 |
| 3,618,778 A | * | 11/1971 | Benton et al. .................. | 210/150 |
| 3,963,810 A | | 6/1976 | Holmberg et al. | |
| 4,240,814 A | * | 12/1980 | Regehr et al. ................... | 55/423 |
| 4,732,713 A | * | 3/1988 | Korsell ....................... | 261/112.2 |
| 5,413,872 A | * | 5/1995 | Faigle .......................... | 428/603 |
| 6,212,907 B1 | * | 4/2001 | Billingham et al. ............ | 62/646 |
| 6,422,738 B2 | * | 7/2002 | Doring .......................... | 366/337 |
| 6,460,832 B1 | * | 10/2002 | Mockry et al. .............. | 261/112.1 |
| 6,478,290 B1 | * | 11/2002 | Ender et al. ................. | 261/112.2 |
| 7,491,325 B2 | * | 2/2009 | Kulick et al. ................. | 210/150 |
| 2004/0060769 A1 | | 4/2004 | Hentschel et al. | |

FOREIGN PATENT DOCUMENTS

EP        0 361 225 A1 * 9/1989

OTHER PUBLICATIONS

Notification of Transmittal of the International Search Report and the Written Opinion of the International Searching Authority, or the Declaration issued Mar. 15, 2013 for Corresponding PCT Application No. PCT/US12/70983.

* cited by examiner

*Primary Examiner* — Charles Bushey
(74) *Attorney, Agent, or Firm* — Rader, Fishman & Grauer PLLC

(57) ABSTRACT

A heat exchanger plate includes a corrugated sheet of stiff material configured in a repetitive series of elongated corrugations. Each corrugation has a first corrugation segment, a second corrugation segment disposed offset from and extending parallel to the first corrugation segment and an intermediate corrugation segment. The first and second corrugation segments extend vertically. The intermediate corrugation segment is disposed between and interconnects the first corrugation segment and the second corrugation segment and extends obliquely relative to the first corrugation segment and the second corrugation segment to form a continuous, uninterrupted offset corrugation. A plurality of the heat exchanger plates are connected together to form a fill pack.

27 Claims, 31 Drawing Sheets

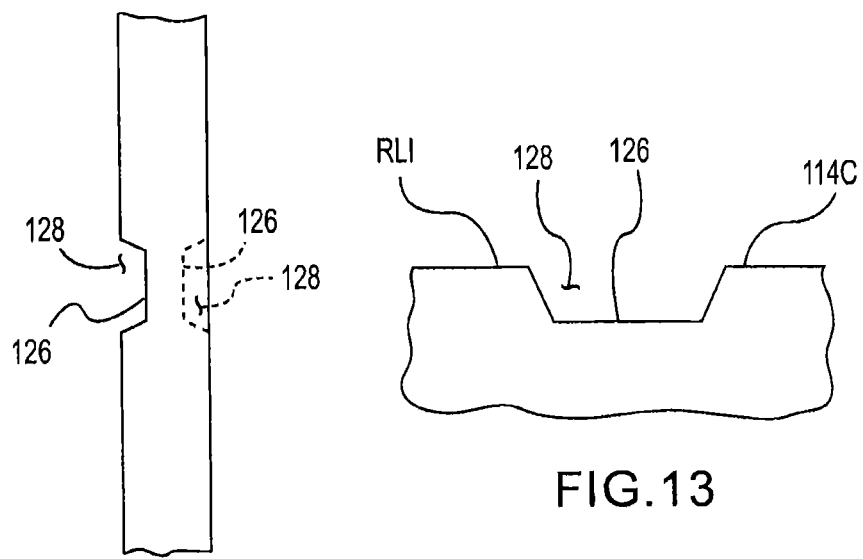

HEAT EXCHANGER PLATE AND A FILL PACK OF HEAT EXCHANGER PLATES

FIELD OF THE INVENTION

The present invention relates to a heat exchanger plate. More particularly, the present invention is directed to a heat exchanger plate fabricated from sheet material and a fill pack constructed of a plurality of the heat exchanger plates of the present invention.

BACKGROUND OF THE INVENTION

Heat exchangers are well known in industry and are designed to efficiently transfer heat from one medium to another. There are many types and sizes of heat exchangers and a particular type of heat exchanger is typically selected depending upon its use such as for refrigeration, air conditioning, chemical plants, petroleum refineries and power plants.

For power plants, water cooling towers are used to transfer waste heat into the atmosphere. These cooling towers are very large and use the evaporation of water to remove waste heat and cool water to near the wet-bulb air temperature. One type of cooling tower used for power plants is a field-erected hyperboloid cooling tower 10 shown in FIG. 1. Heated water 12h is distributed in the hyperboloid cooling tower 10 over a conventional fill pack assembly 14. As represented in FIG. 1, ambient air AA enters at the bottom of hyperboloid cooling tower 10, flows upwardly through the fill pack assembly 14 and exits the hyperboloid cooling tower 10 as heated air HA while the heated water 12h flows, i.e. drips or rains, downwardly through the fill pack assembly 14 and exits the fill pack assembly 14 as cooled water 12c. This arrangement is commonly known in the industry as "counterflow".

The conventional fill pack assembly 14 comprises a plurality conventional fill packs 13. The fill packs 13 are positioned side-by-side one another inside of the hyperboloid cooling tower 10. Each one of the fills packs 13 includes a plurality of heat exchanger plates 16 as best shown in FIGS. 2 and 3. The fill pack 13 is referred to as VertiClean Film Fill™, a trademark of Evaptech located in Lenexa, Kans. Each heat exchanger plate 16 is a corrugated sheet of polyvinyl chloride PVC material configured in a repetitive series of vertically-extending corrugations 15 that define vertically-extending flutes 17 formed between the vertically-extending corrugations 15. These heat exchanger plates 16 are fabricated by vacuum-forming sheets of PVC.

In FIG. 4, three heat exchanger plates 16, shown in a partial top planar view, are affixed to each other by an adhesive 18 that is disposed between facially-opposing glue points 20. Note that the glue points 20 are flush with respective ridgelines RL of the corrugations 15. All of the heat exchanger plates 16 that comprise the fill pack 13 are identical to one another. As is known in the art, to create the air-water flow passages 19 between the identical heat exchanger plates 16, one of two facially-opposing heat exchanger plate 16 is rotated 180° relative to a central vertical axis so that only front sides of the two facially-opposing heat exchanger plates 16 are affixed to each other while only rear sides of two facially-opposing heat exchanger plates 16 are affixed to each other. This is a commonly-known fabrication technique in the art of fabricating each fill pack 13.

Another conventional fill pack assembly 24 is similar to the fill pack assembly 14 described above except that, as best shown in FIGS. 5-7, the fill pack assembly 24 includes a plurality of fill packs 23 that are fabricated from differently-configured heat exchanger plates 26. The fill pack 23 is referred to as TechClean Film Fill™, a trademark of Evaptech located in Lenexa, Kans. The heat exchanger plate 26 is a corrugated sheet of PVC material configured in two repetitive series of foreshortened vertically-extending corrugations 25a and 25b.

The heat exchanger plate 26 includes a top edge 28, a bottom edge 30 disposed apart from and extending parallel to the top edge 28 and a pair of side edges 32. The side edges 32 are disposed apart from and extend parallel to each other and the pair of side edges 32 are connected to and between the top edge 28 and bottom edge 30 to form a generally rectangular configuration as best shown in FIG. 7. One repetitive series of foreshortened vertically-extending upper corrugations 25a commences adjacent the top edge 28 and extends downwardly therefrom to at least approximately a horizontal midpoint line HMPL of the heat exchanger plate 26 in FIG. 7. The remaining repetitive series of foreshortened vertically-extending lower corrugations 25b commences adjacent the bottom edge 30 and extends upwardly therefrom to at least approximately the horizontal midpoint line HMPL of the heat exchanger plate 26. Note that the upper corrugations 25a and the lower corrugations 25b are horizontally offset in a widthwise direction from one another as best shown in FIG. 7.

SUMMARY OF THE INVENTION

One embodiment of a heat exchanger plate of the present invention includes a corrugated sheet of stiff material configured in a repetitive series of elongated corrugations. Each corrugation has a first corrugation segment, a second corrugation segment disposed offset from and extending parallel to the first corrugation segment and an intermediate corrugation segment. The first and second corrugation segments extend vertically. The intermediate corrugation segment is disposed between and interconnects the first corrugation segment and the second corrugation segment and extends obliquely relative to the first corrugation segment and the second corrugation segment to form a continuous, uninterrupted offset corrugation.

Another embodiment of a fill pack of the present invention includes a plurality of the heat exchanger plates described immediately above. Sequential ones of the plurality of corrugated sheets facially oppose each other and are connected together. Each corrugated sheet has a front side surface and a rear side surface disposed opposite the front side surface. Connected ones of the plurality of corrugated sheets are connected together in a manner that the front side surfaces are facially opposed to each other while the rear side surfaces are facially opposed to each other.

The present invention will be better appreciated in view of the detailed description of the exemplary embodiments of the present invention discussed hereinbelow with reference to the accompanying drawings, in which:

BRIEF DESCRIPTION OF THE DRAWINGS

FIG. 12 is a partial side elevational view of the first exemplary embodiment of the heat exchanger plate of the present invention.

FIG. 13 is an enlarged partial side elevational view of one intermediate corrugation segment taken along line 13-13 of the first exemplary embodiment of the heat exchanger plate of the present invention in FIG. 9.

DETAILED DESCRIPTION OF THE EXEMPLARY EMBODIMENTS

Hereinafter, embodiments of the present invention will be described with reference to the attached drawings. The structural components common to those of the prior art and the structural components common to respective embodiments of the present invention will be represented by the same symbols and repeated description thereof will be omitted.

Figure 1:
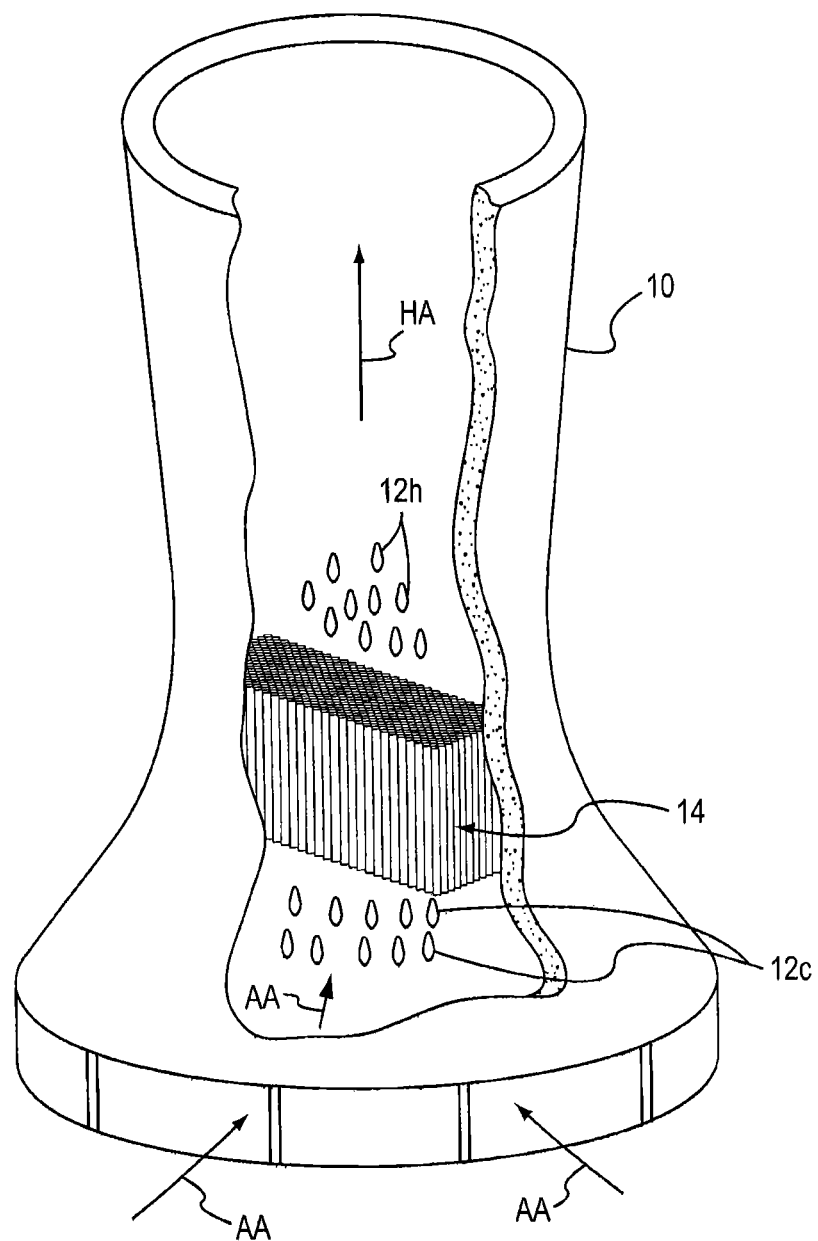
FIG. 1 is a perspective view partially broken away of a conventional hyperboloid water cooling tower with a conventional fill pack assembly disposed therein.
Figure 2:
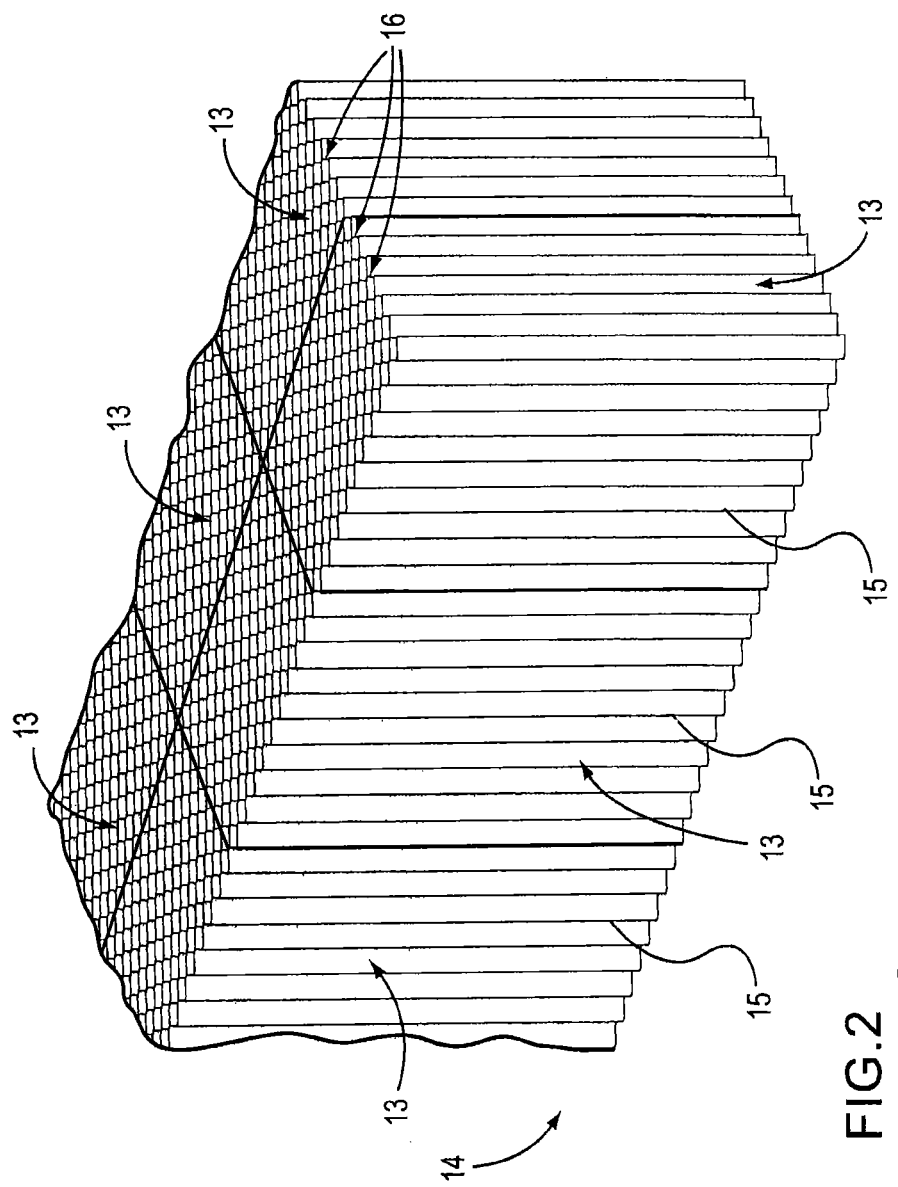
FIG. 2 is a partial perspective view of one type of the conventional fill pack assembly shown in FIG. 1.
Figure 3:
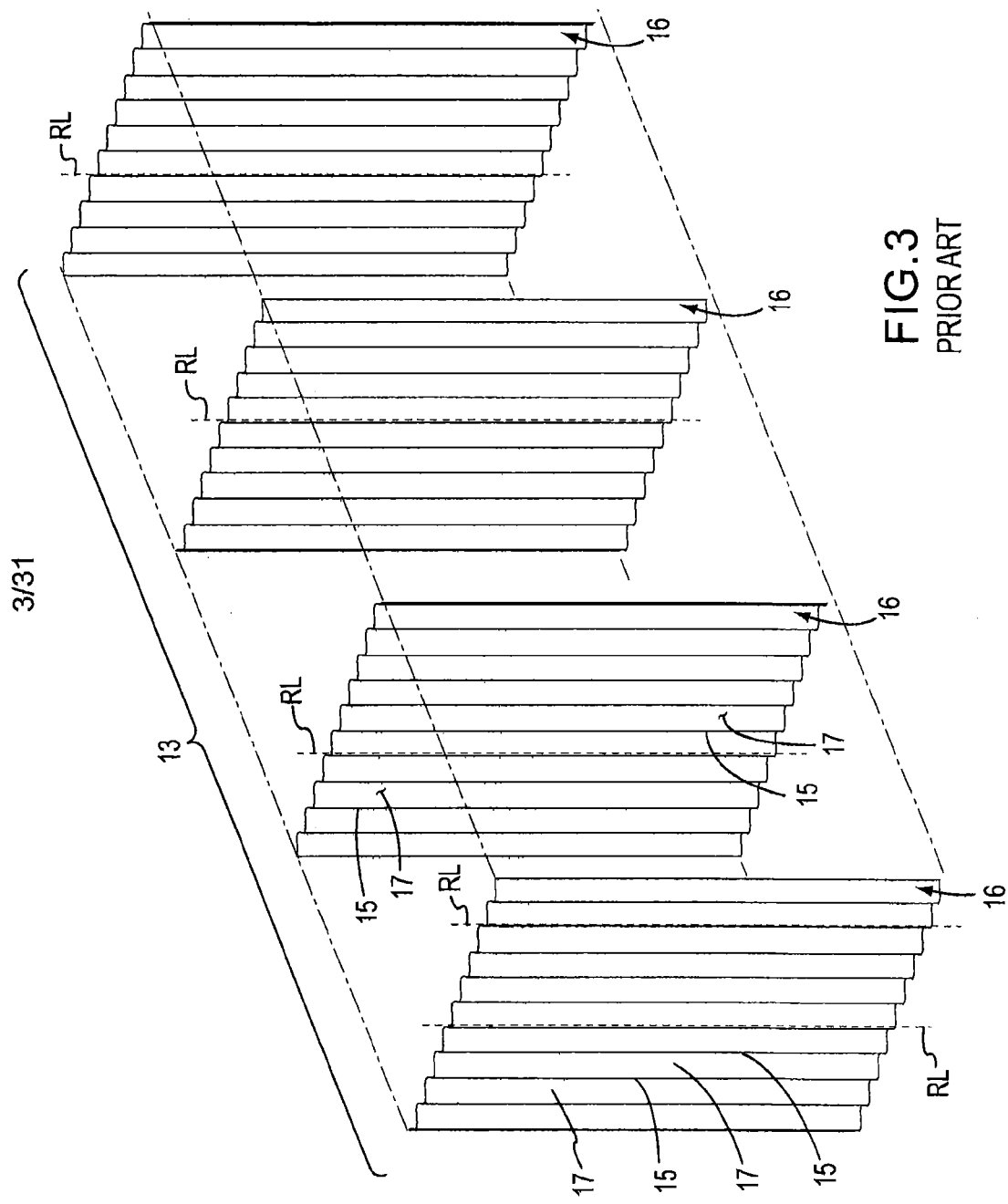
FIG. 3 is an exploded perspective view of the conventional fill pack assembly shown in FIG. 2.
Figure 4:
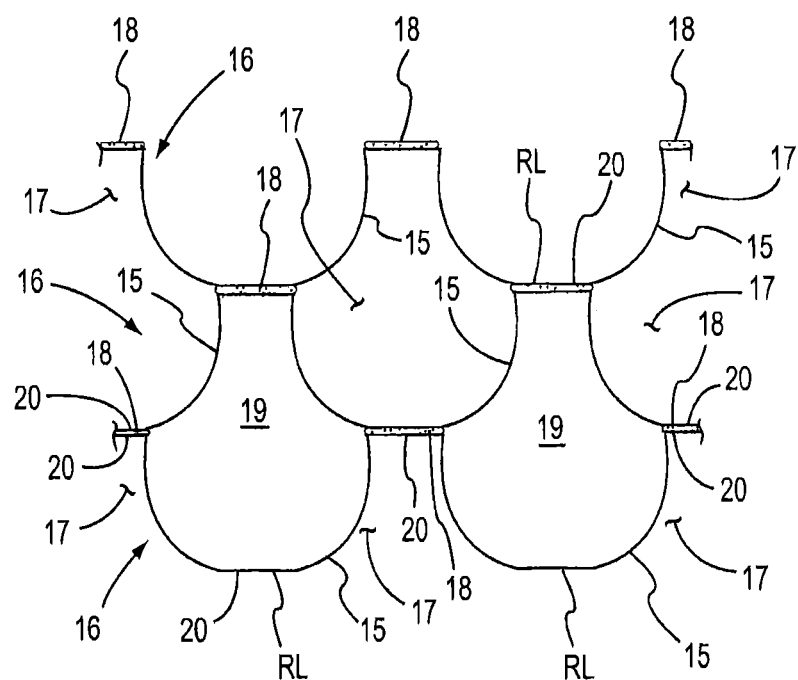
FIG. 4 is a partial top planar view of the conventional fill pack assembly shown in FIGS. 2 and 3.
Figure 5:
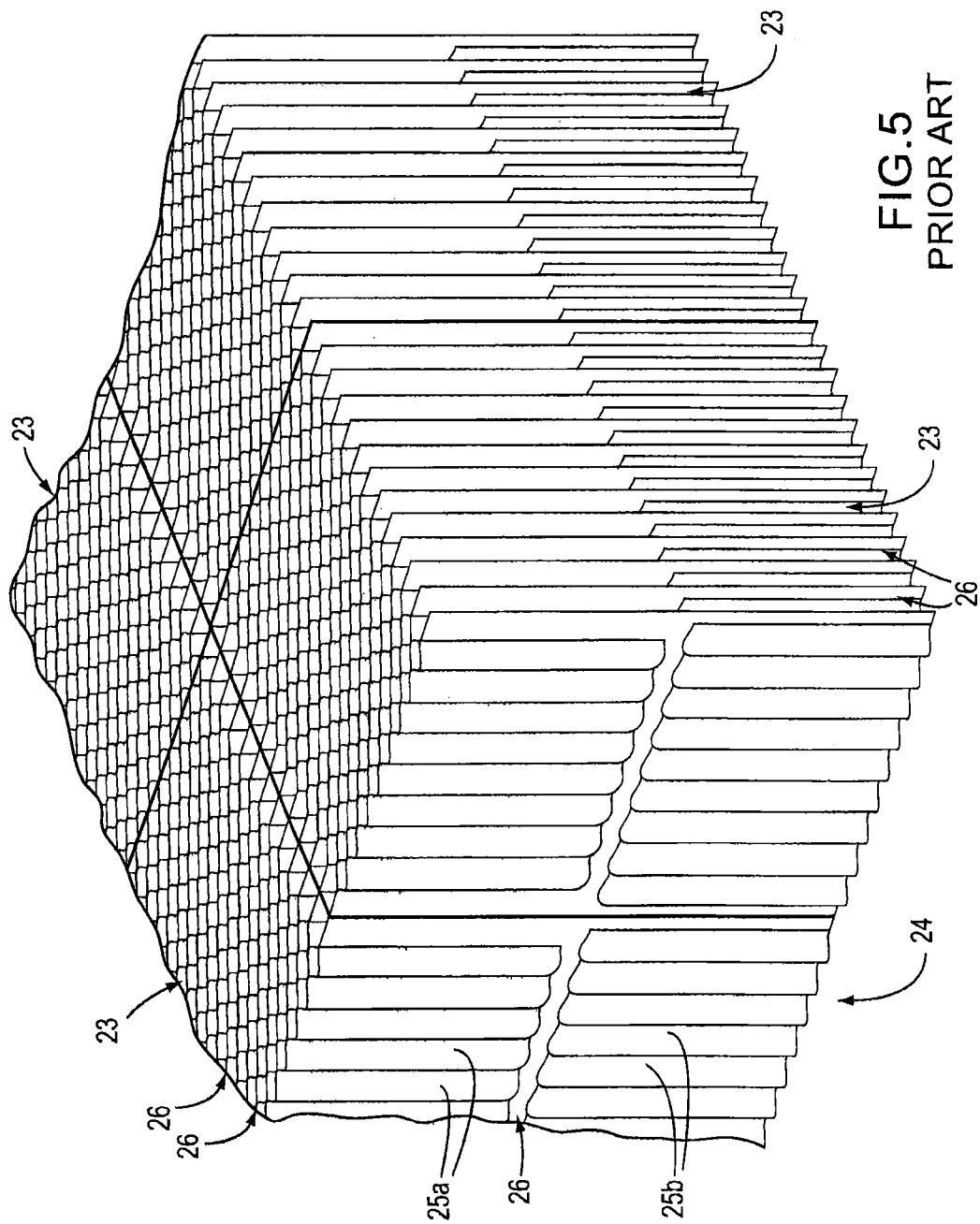
FIG. 5 is a partial perspective view of another type of the conventional fill pack assembly shown in FIG. 1.
Figure 6:
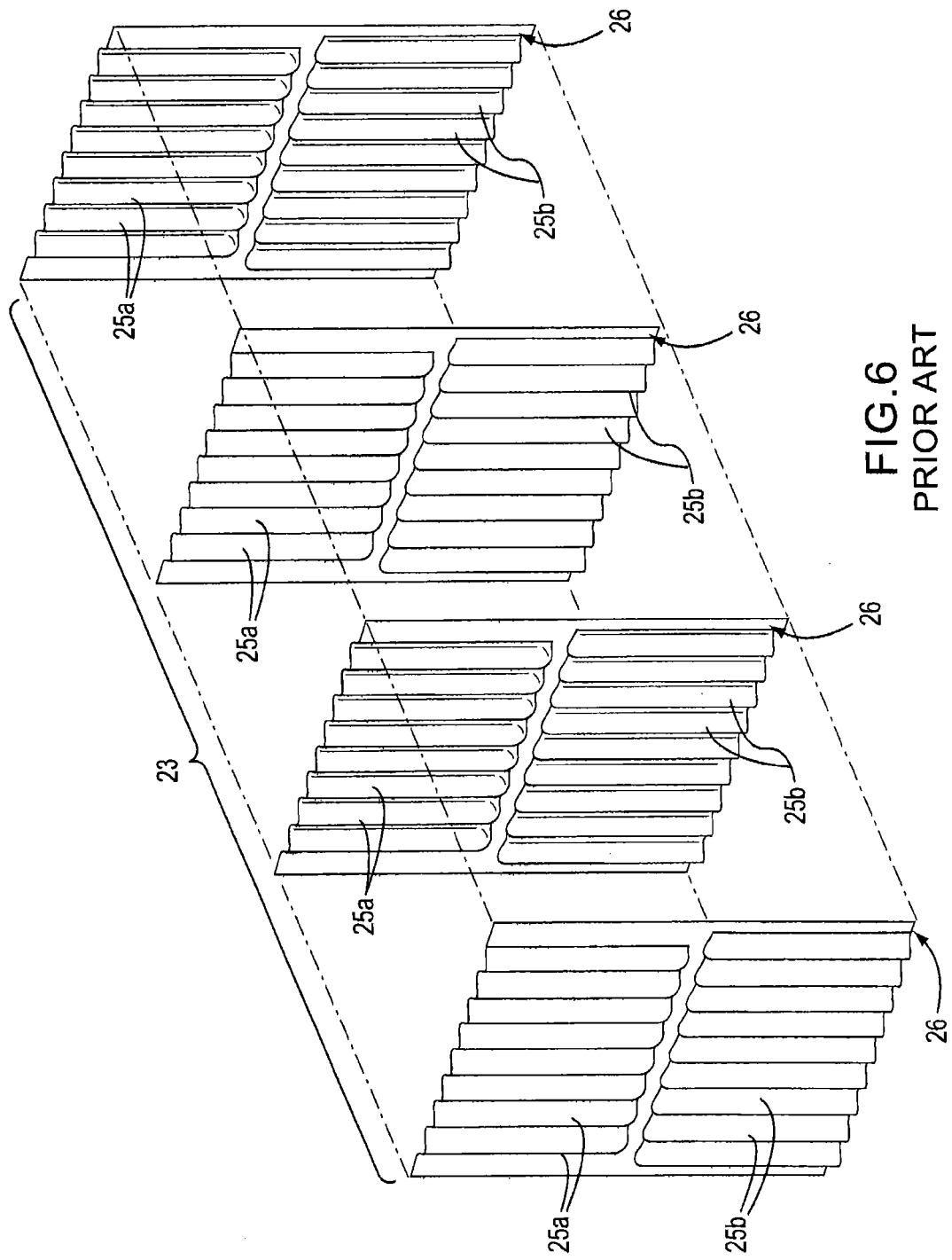
FIG. 6 is an exploded perspective view of the conventional fill pack assembly shown in FIG. 5.
Figure 7:
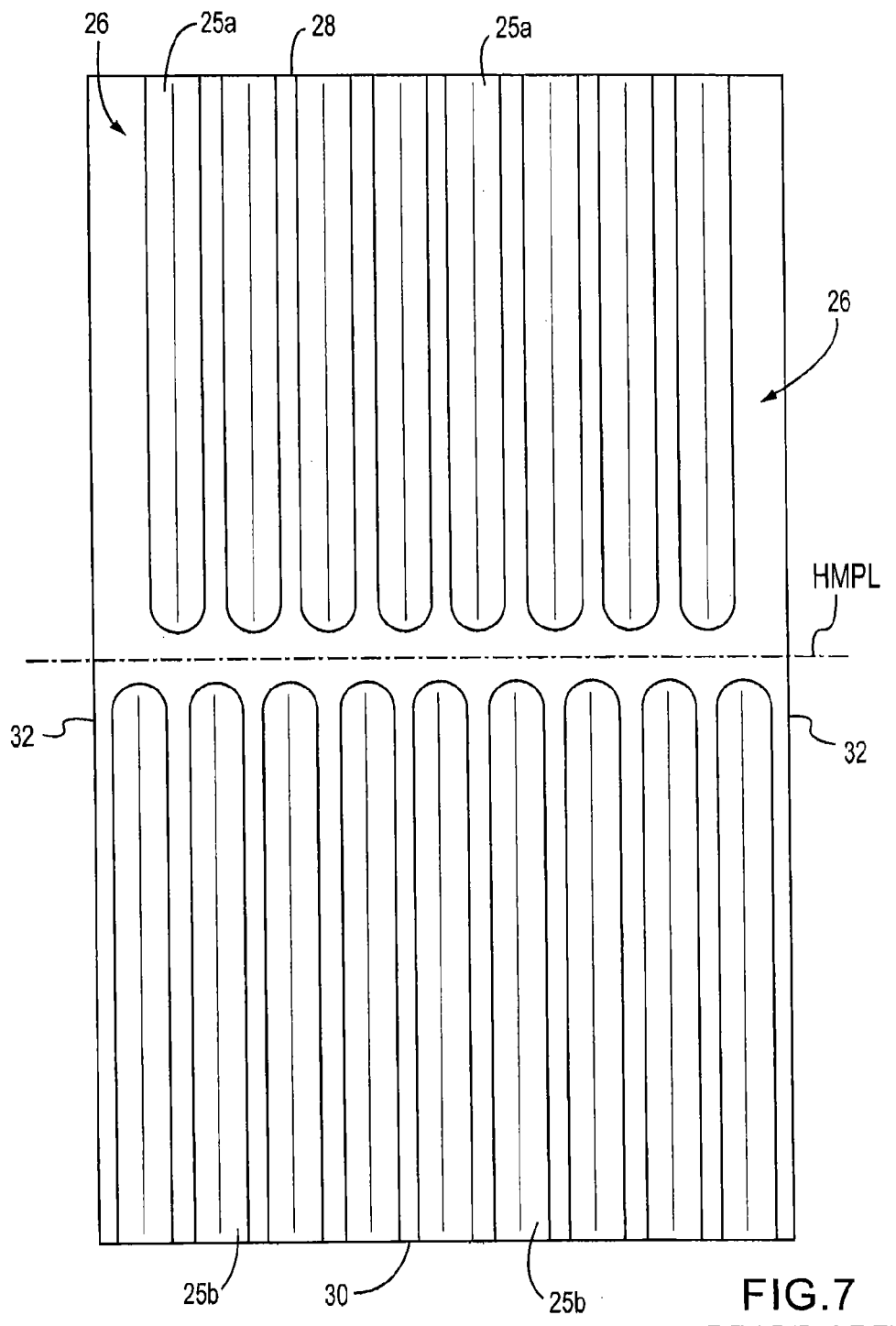
FIG. 7 is a front elevational view of the conventional fill pack assembly shown in FIGS. 5 and 6.
Figure 8:
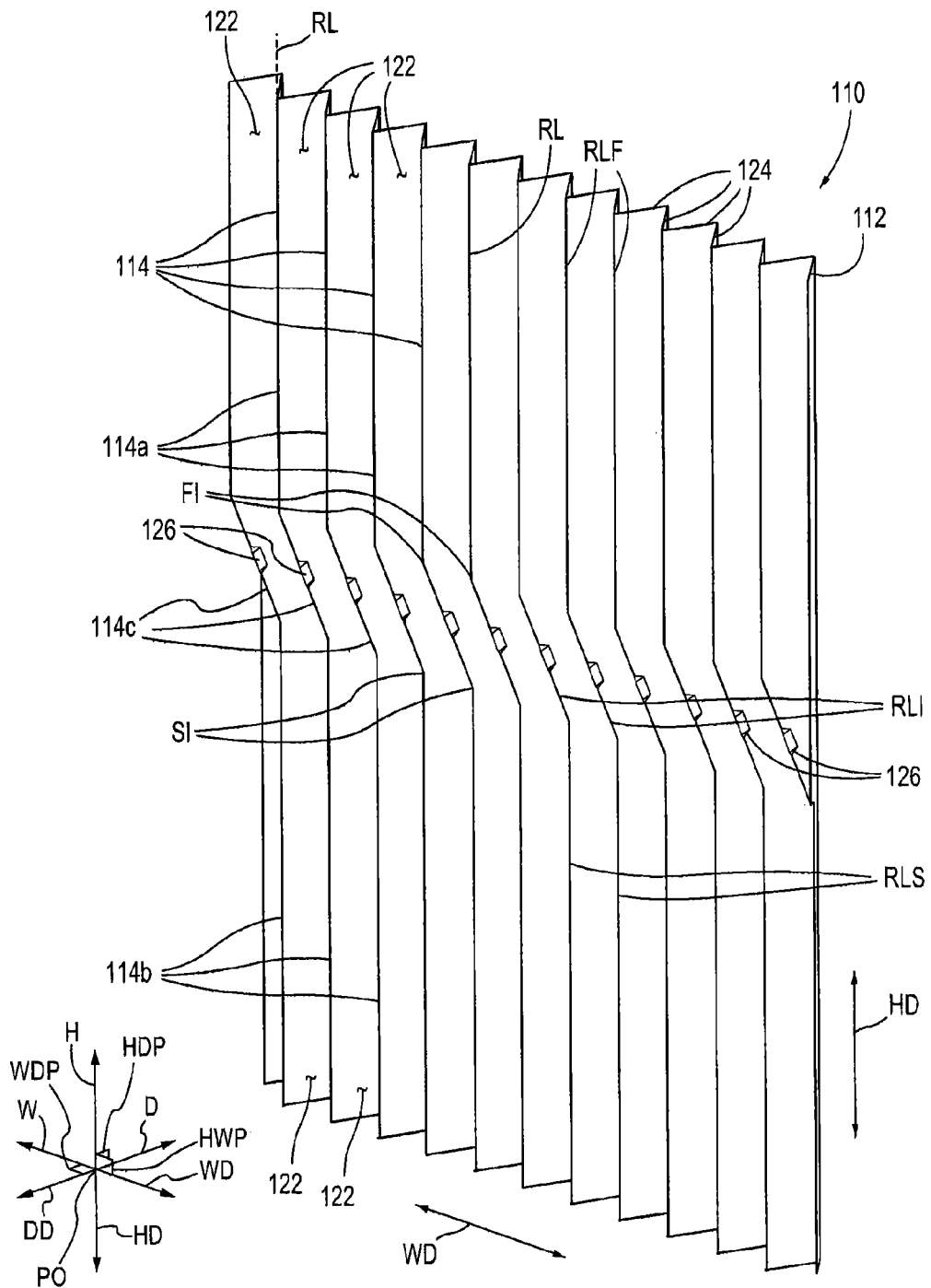
FIG. 8 is a perspective view of a first exemplary embodiment of a heat exchanger plate of the present invention having repetitive series of corrugations with each corrugation having a first corrugation segment, a second corrugation and an intermediate corrugation segment interconnecting the first and second corrugation segments.
Figure 9:
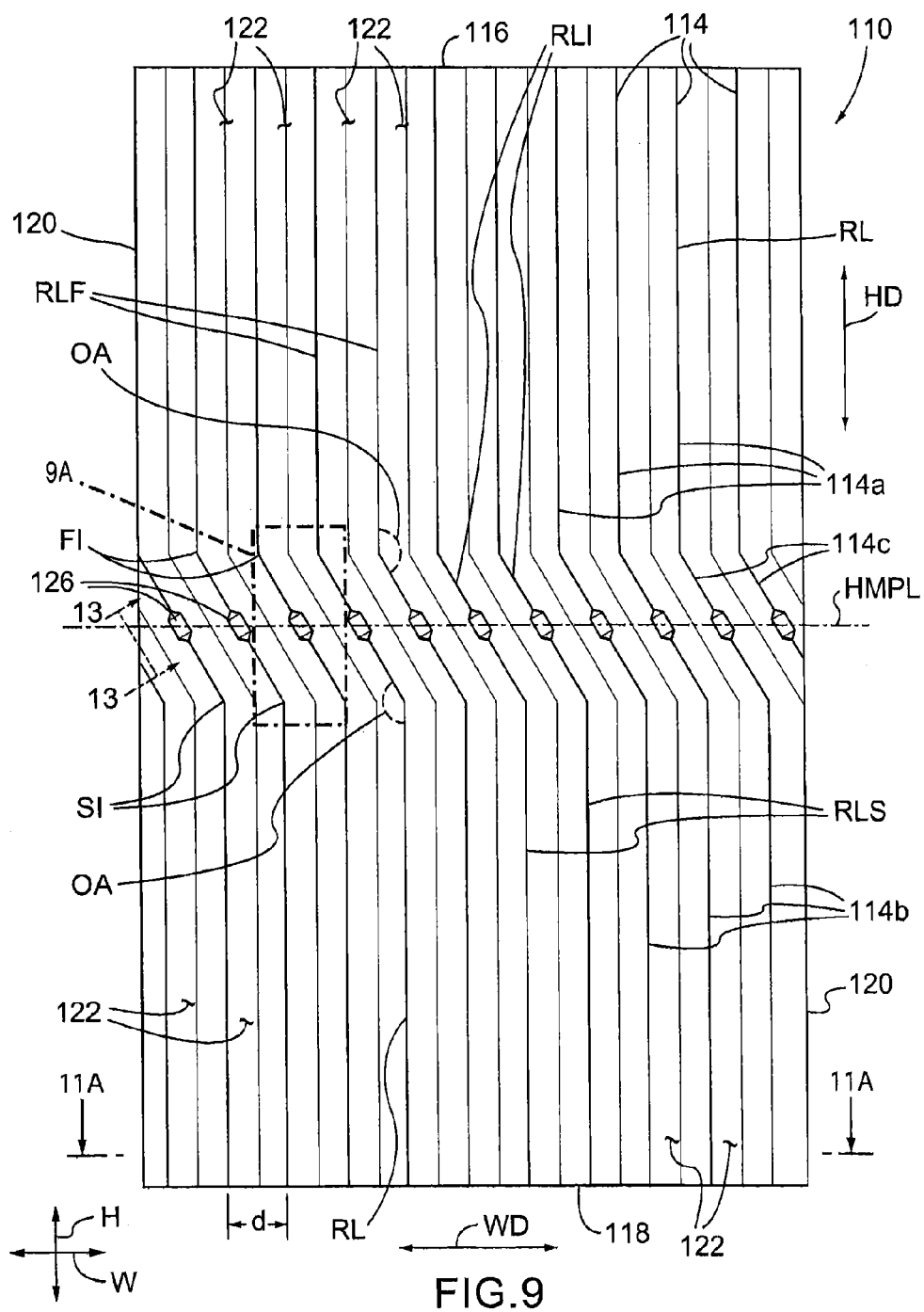
FIG. 9 is a front elevational view of the first exemplary embodiment of the heat exchanger plate of the present invention.
Figure 10:
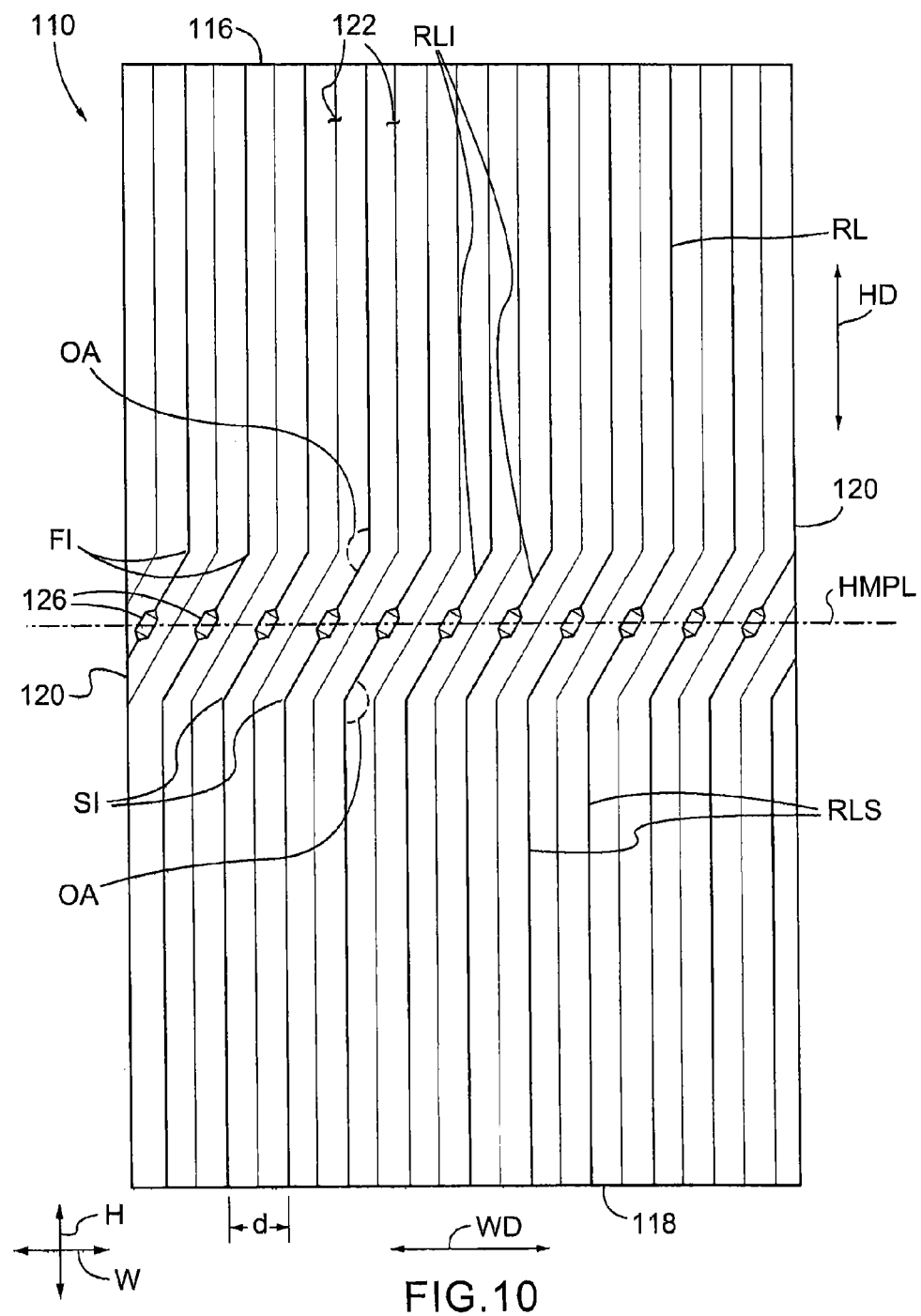
FIG. 10 is a rear elevational view of the first exemplary embodiment of the heat exchanger plate of the present invention.

A first exemplary embodiment of a heat exchanger plate 110 of the present invention is hereinafter described with reference to FIGS. 8-13. As best shown in FIGS. 8-10, the heat exchanger plate 110 of the present invention includes a corrugated sheet 112 of material. With reference to FIG. 8, the sheet of material extends along and about a height-wise axis H defining a height-wise direction HD, a widthwise axis W defining a width-wise direction WD and a depth-wise axis D defining a depth-wise direction DD. The height-wise axis H, the widthwise axis W and the depth-wise axis D perpendicularly intersect one another at a common point of intersection PO to form a conventional Cartesian coordinate system as generally shown in FIG. 8. A skilled artisan would appreciate that the height-wise axis H and the widthwise axis W form a height/width plane HWP, the height-wise axis H and the depth-wise axis D form a height/depth plane HDP and the width-wise axis W and the depth-wise axis D form a width/depth plane WDP.

It is preferred that the sheet material is stiff yet pliable and can be any material commonly used for heat exchanger plates and fill packs such as metal or thermoplastic polymer like polyvinyl chloride (PVC), for example. The corrugated sheet 112 is configured in a repetitive series of elongated corrugations 114. Each corrugation 114 has a first corrugation segment 114a, a second corrugation segment 114b and an intermediate corrugation segment 114c. The first corrugation segment 114a and the second corrugation segment 114b are disposed horizontally offset in the width-wise direction WD from each other at a distance d shown in FIGS. 9 and 10. Further, the second corrugation segment 114b extends parallel to the first corrugation segment 114a as indicated by imaginary ridgeline parts RLF and RLS in FIGS. 9 and 10 and as discussed in more detail below.

With reference to FIGS. 9 and 10, the intermediate corrugation segment 114c is disposed between the first corrugation segment 114a and the second corrugation segment 114b. Also, the intermediate segment 114c interconnects the first corrugation segment 114a and the second corrugation segment 114b, preferably, in a continuous, uninterrupted manner. The intermediate corrugation segment 114c extends obliquely relative to the first corrugation segment 114a and the second corrugation segment 114b. As a result each corrugation 114 is formed as a continuous, uninterrupted offset corrugation 114.

In FIGS. 9 and 10, the corrugated sheet 110 includes a top edge 116, a bottom edge 118 and a pair of side edges 120. The bottom edge 118 is disposed apart from and extends parallel to the top edge 116. The pair of side edges 120 are disposed apart from and extend parallel to each other. Also, the pair of side edges 120 are connected to and between the top edge 116 and bottom edge 118 to form a generally rectangular configuration as illustrated in FIGS. 9 and 10.

Again, with reference to FIGS. 9 and 10, each one of the first corrugation segments 114a extends vertically at or adjacent the top edge 116 and partially towards the bottom edge 118 short of the horizontal midpoint line HMPL. Correspondingly, each one of the second corrugation segments 114b extends vertically from or adjacent the bottom edge 118 and partially towards the top edge 116 short of the horizontal midpoint line HMPL.

Figure 11:
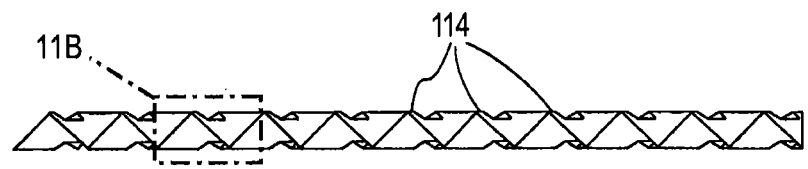
FIG. 11 is a top planar view of the first exemplary embodiment of the heat exchanger plate of the present invention.
Figure 11A:
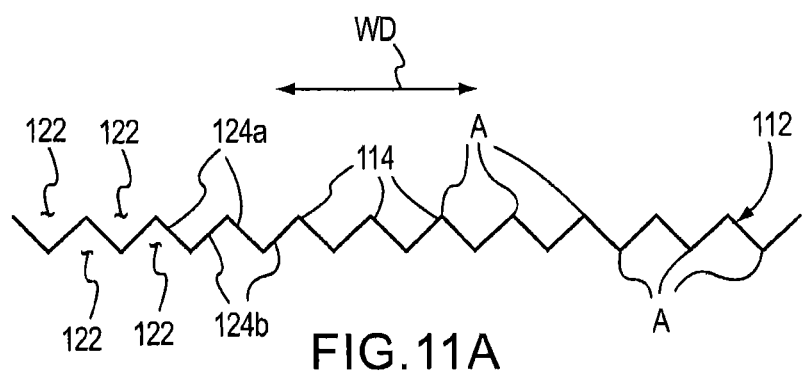
FIG. 11A is a cross-sectional view of the first exemplary embodiment of the heat exchanger plate of the present invention taken along line 11A-11A in FIG. 9.
Figure 11B:
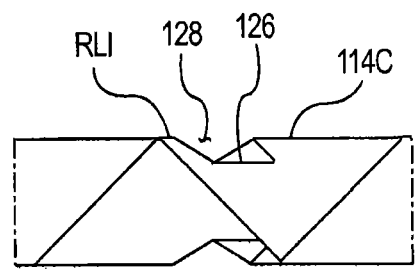
FIG. 11B is a partial, enlarged top planar view of the first exemplary embodiment of the heat exchanger plate of the present invention taken from dashed box 11B in FIG. 11.
Figure 14:
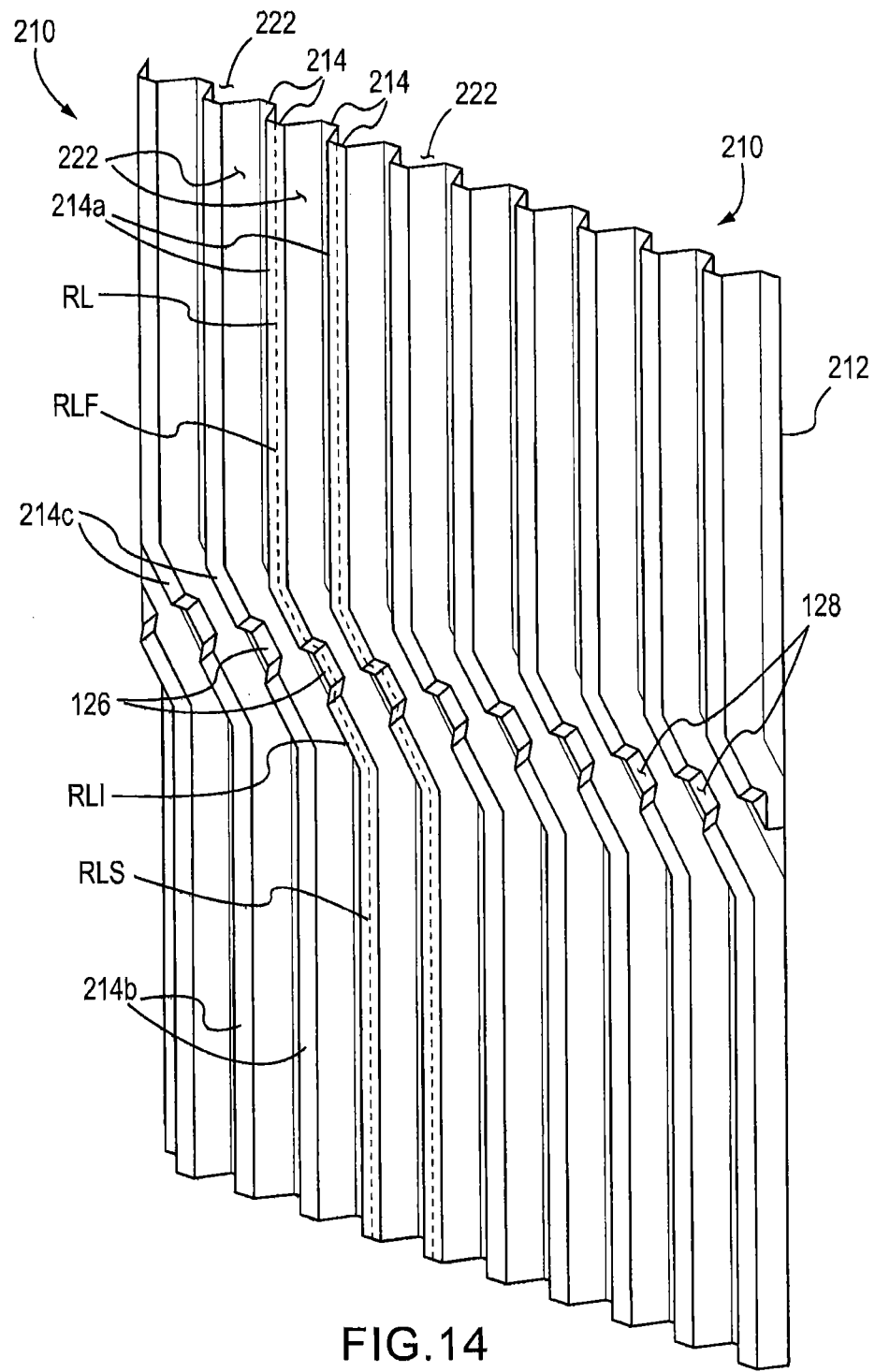
FIG. 14 is a perspective view of a second exemplary embodiment of the heat exchanger plate of the present invention.
Figure 15:
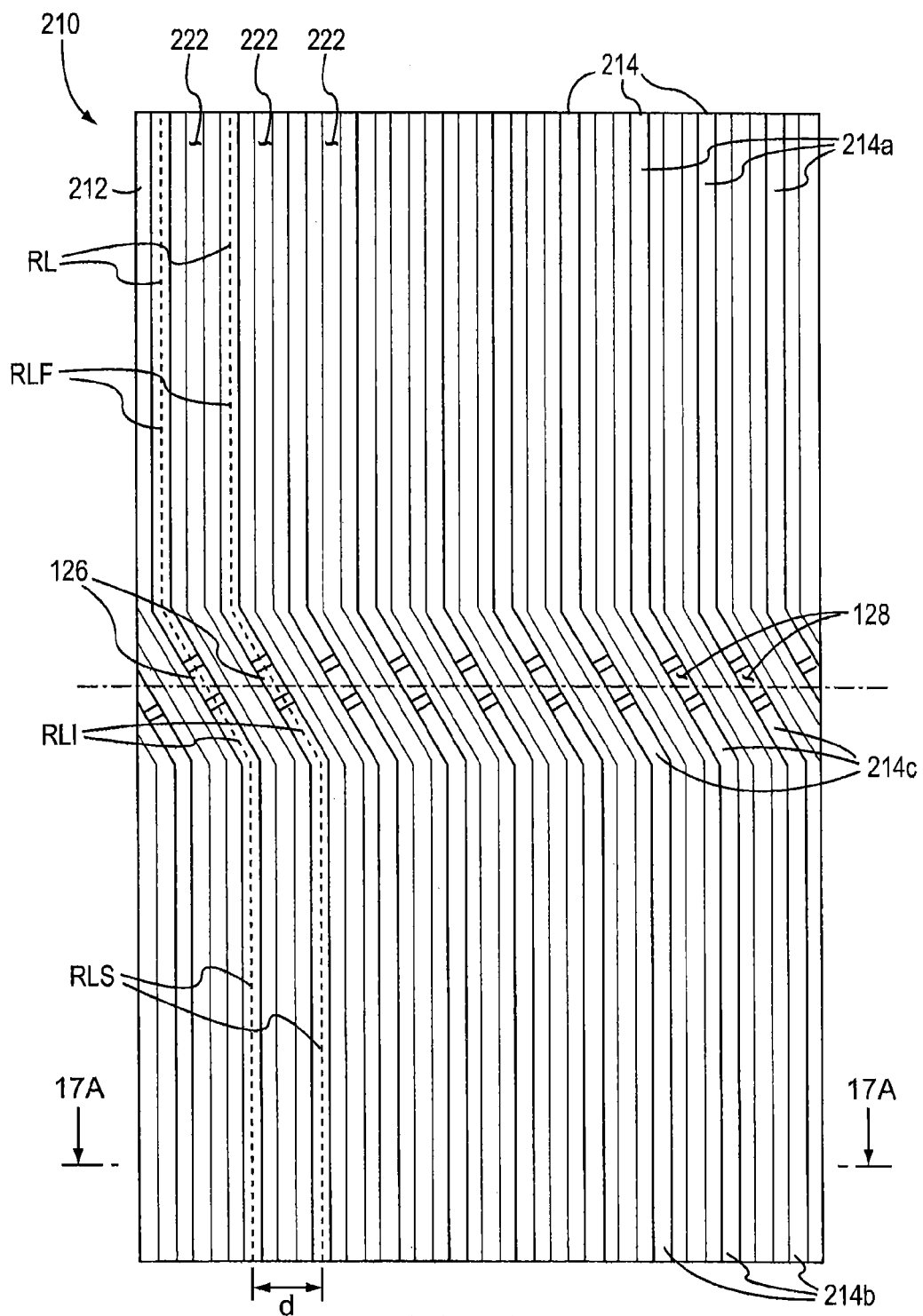
FIG. 15 is a front elevational view of the second exemplary embodiment of the heat exchanger plate of the present invention.
Figure 16:
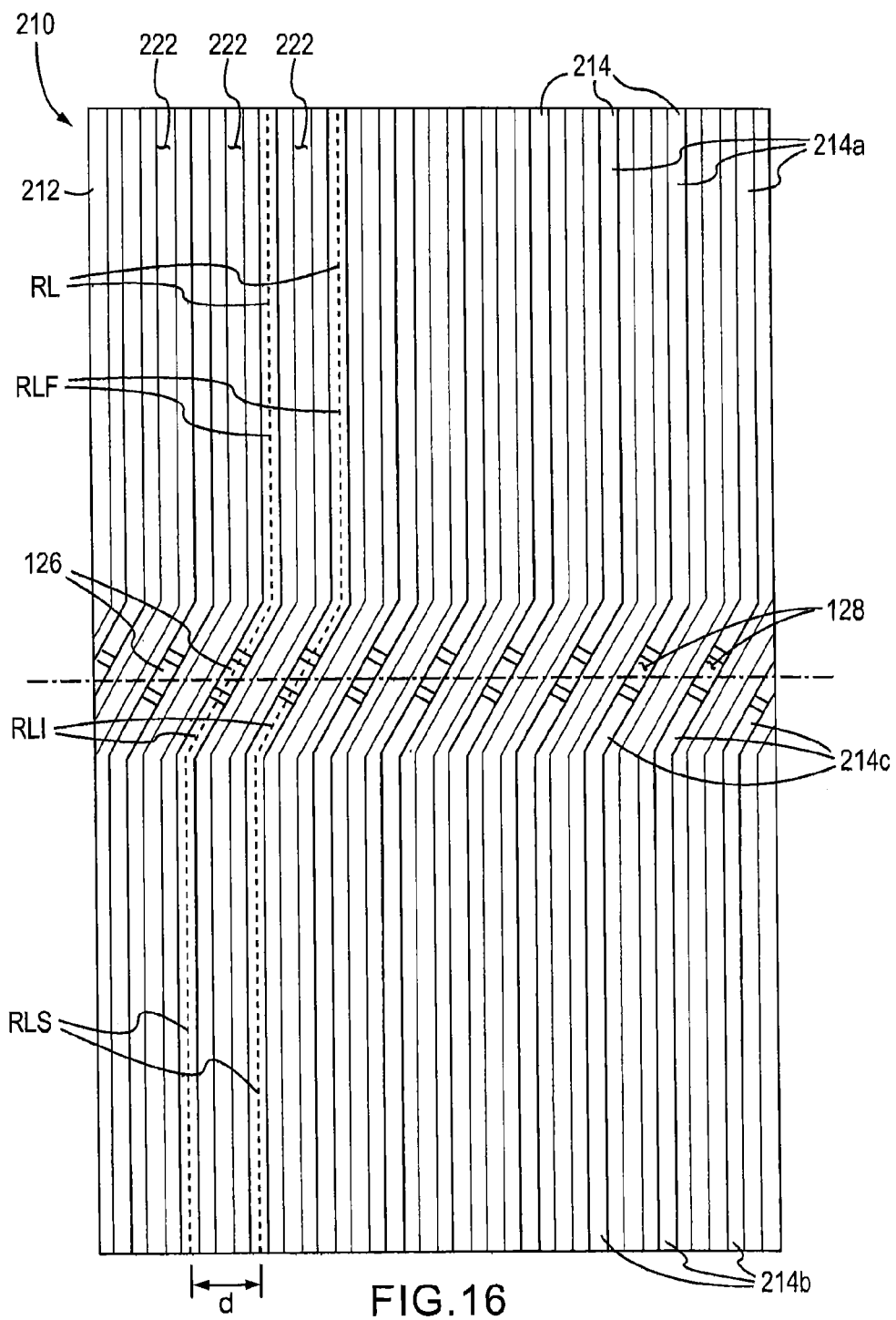
FIG. 16 is a rear elevational view of the second exemplary embodiment of the heat exchanger plate of the present invention.

Illustrated in FIGS. 8-10, the repetitive series of elongated corrugations 114 define a repetitive series of flutes 122. Each one of the repetitive series of elongated corrugations 114 is configured in a V-shape as best shown in FIG. 11A and, correspondingly, each one of the repetitive series of flutes 122 is configured in a V-shape as best viewed in FIG. 11A. As best shown in FIGS. 11 and 11A, each one of the repetitive series of elongated corrugations 114 is integrally connected together in sequence to form a zigzag configuration. Furthermore, in FIG. 11A, each one of the repetitive series of elongated corrugations 114 is formed by a first wall piece 124a and a second wall piece 124b and respective ones of the first wall pieces 124a and the second wall pieces 124b are integrally formed together at respective apices A. Again, with reference to FIGS. 8-10, the apices A themselves define an imaginary corrugation ridgeline RL that extends to and between the top edge 116 of the heat exchanger plate 110 and the bottom edge 118 of the heat exchanger plate 110. In other words, along the apices A of each one of the first corrugation segments 114a, of each one of the second corrugation segments 114b and of each one of the intermediate corrugation segments 114c define the imaginary corrugation ridgeline RL.

The imaginary ridgeline RL has a first ridgeline part RLF, a second ridgeline part RLS that extends parallel to and offset in a widthwise direction WD from the first ridgeline part RLF and an intermediate ridgeline part RLI. Each one of the first ridgeline part RLF, the second ridgeline part RLS and the intermediate ridgeline part RLI is straight. As best shown in FIGS. 9 and 10, the intermediate ridgeline part RLI interconnects and extends at an oblique angle OA relative to the first ridgeline part RLF and the second ridgeline part RLS. By way of example only and not by way of limitation, the oblique angle OA is selected from a range of angles to and between $150°$ and $170°$ inclusively and, preferably, to and between $160°$ and $168°$ inclusively. However, one of ordinary skill in the art would appreciate that other oblique angles OA might be employed without departing from the spirit of the present invention.

As shown in FIGS. 8-10, 11B, 12 and 13, each one of the intermediate corrugation segments 114c includes a recessed surface portion 126. The recessed surface portion 126 is flat and defines a recess 128 that is formed into the intermediate corrugation segment 114c at the intermediate ridgeline part RLI as best shown in FIGS. 12 and 13. By way of example only and not by way of limitation, each recessed surface portion 126 is positioned generally centrally on the intermediate corrugation segment 114c between a first interface FI where the first corrugation segment 114a and the intermediate corrugation segment 114c are connected and a second interface SI where the second corrugation segment 114b and the intermediate corrugation segment 114c are connected as shown in FIGS. 8-10.

Figure 17:
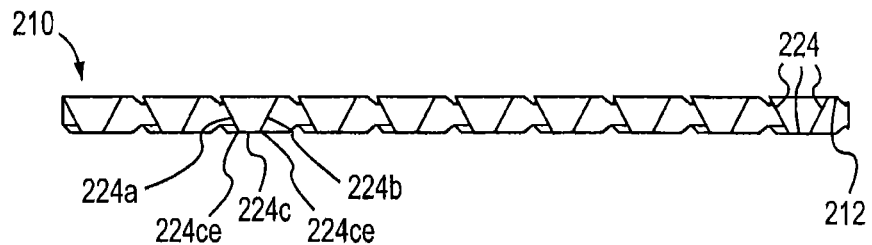
FIG. 17 is a top planar view of the second exemplary embodiment of the heat exchanger plate of the present invention.
Figure 17A:
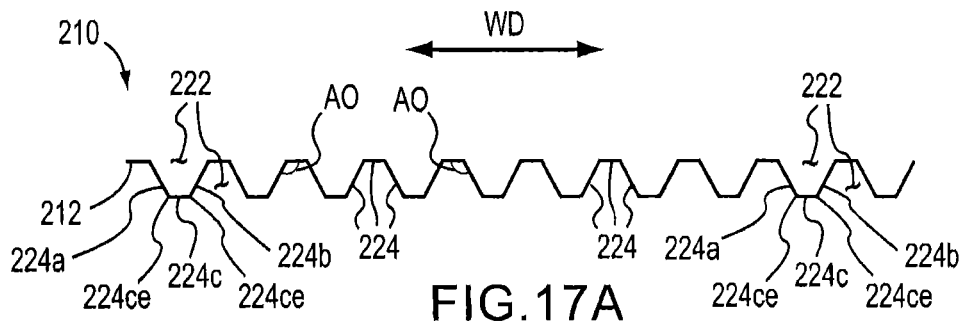
FIG. 17A is a partial cross-sectional view of the second exemplary embodiment of the heat exchanger plate of the present invention taken along line 17A-17A in FIG. 15.
Figure 18:
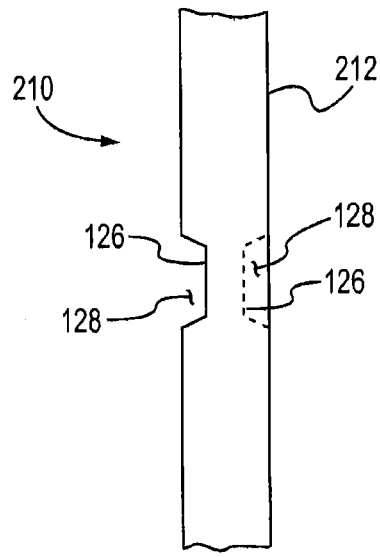
FIG. 18 is a partial side elevational view of the second exemplary embodiment of the heat exchanger plate of the present invention.

A second exemplary embodiment of a heat exchanger plate 210 of the present invention as illustrated in FIGS. 14-18 is similar to the heat exchanger plate 110 described hereinabove. The heat exchanger plate 210 includes a repetitive series of elongated corrugations 214 with each corrugation 214 having a first corrugation segment 214a, a second corrugation segment 214b and an intermediate corrugation segment 214c. The repetitive series of corrugations 214 defines a repetitive series of flutes 222. Each one of the repetitive series of elongated corrugations 214 is configured in a truncated V-shaped as viewed in planar view as best shown in FIG. 17. Also, each one of the repetitive series of flutes 222 is configured in a truncated V-shape as viewed in planar view as best shown in FIG. 17A. Again, with reference to FIG. 17A, the repetitive series of elongated corrugations 214 forms a truncated zigzag configuration.

In FIG. 17A, each one of the repetitive series of elongated corrugations 214 is formed by a first wall piece 224a, a second wall piece 224b and a ridgeline wall piece 224c. The second wall piece 224b is disposed apart from the first wall piece 224a. The first wall piece 224a and the second wall piece 224b are connected at opposing ends 224ce of the respective ones of the ridgeline wall pieces 224c. Note that the first wall piece 224a and the second wall piece 224b diverge outwardly from the respective opposing ends 224ce of the respective ones of the ridgeline wall pieces 224c at an obtuse angle AO as shown in FIG. 17A. Note in FIGS. 14 and 15 that respective ones of imaginary corrugation ridgelines RL, represented as dashed lines, extend centrally along respective ones of the ridgeline wall pieces 224c.

Figure 19:
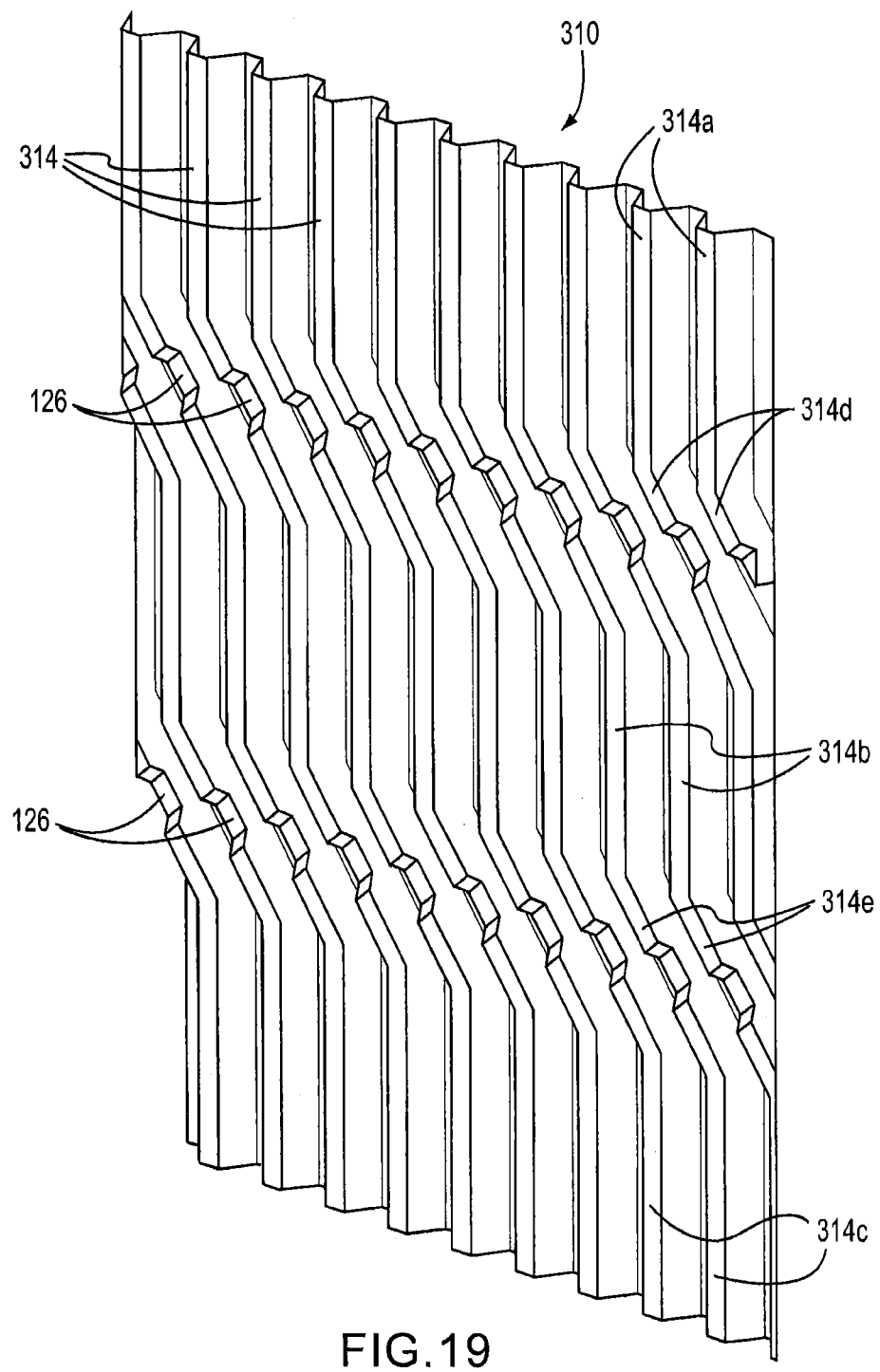
FIG. 19 is a perspective view of a third exemplary embodiment of the heat exchanger plate of the present.
Figure 20:
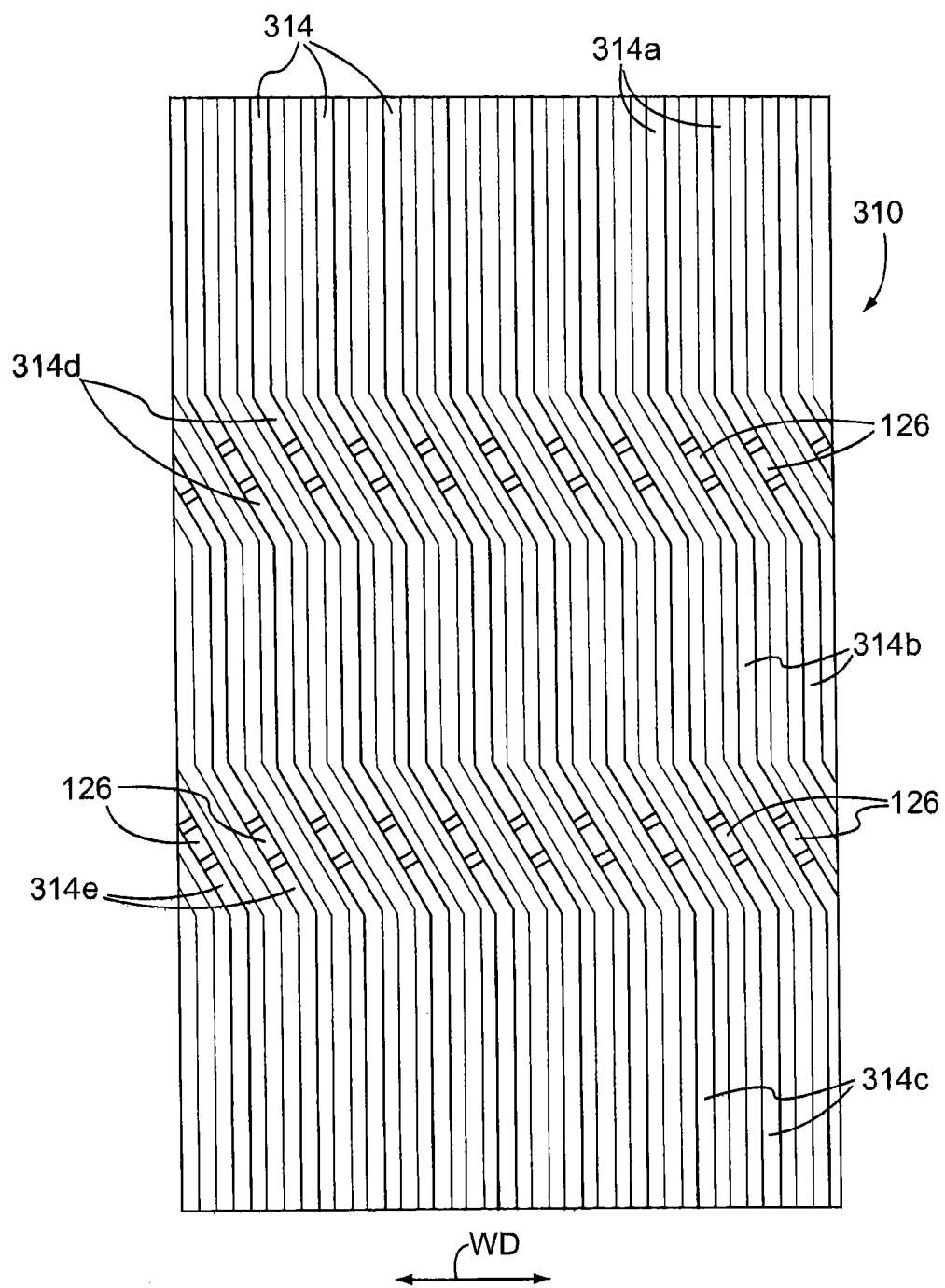
FIG. 20 is a front elevational view of the third exemplary embodiment of the heat exchanger plate of the present invention.
Figure 21:
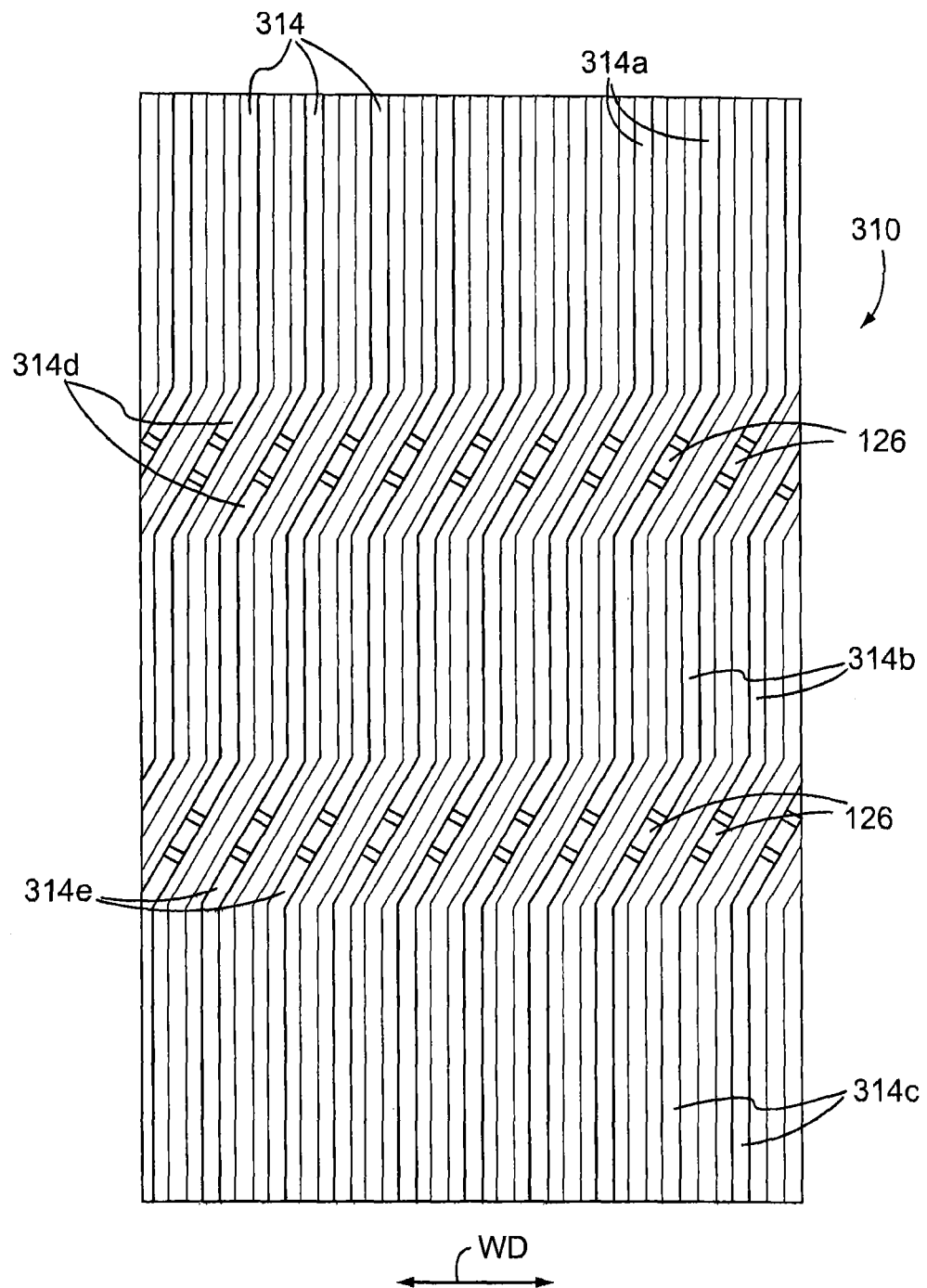
FIG. 21 is a rear elevational view of the third exemplary embodiment of the heat exchanger plate of the present invention.

A third exemplary embodiment of a heat exchanger plate 310 of the present invention as illustrated in FIGS. 19-21 is similar to the heat exchanger plate 210 described hereinabove. However, a difference is that each corrugation 314 has a first corrugation segment 314a, a second corrugation segment 314b, a third corrugation segment 314c, a first intermediate corrugation segment 314d and a second intermediate corrugation segment 314e. The first intermediate corrugation segment 314d is disposed between and interconnects the first and second corrugation segments 314a and 314b respectively and the second intermediate corrugation segment 314e is disposed between and interconnects the second corrugation segment 314b and the third corrugation segment 314c. The first intermediate corrugation segment 314d extends obliquely relative to the first corrugation segment 314a and the second corrugation segment 314b and the second intermediate corrugation segment 314e extends obliquely relative to the second corrugation segment 314b and the third corrugation segment 314c. The first, second and third corrugation segments 314a, 314b and 314c respectively extend parallel to each other and are disposed horizontally offset relative to each other in the widthwise direction WD as best shown in FIGS. 20 and 21.

A fourth exemplary embodiment of a fill pack 410 of the present invention, as depicted in FIGS. 22-26, includes a plurality of corrugated sheets 212 as described above. One of ordinary skill in the art would appreciate that any of the above-described corrugated sheets could be employed and the particular corrugated sheets 212 were selected by way of example only.

Figure 22:
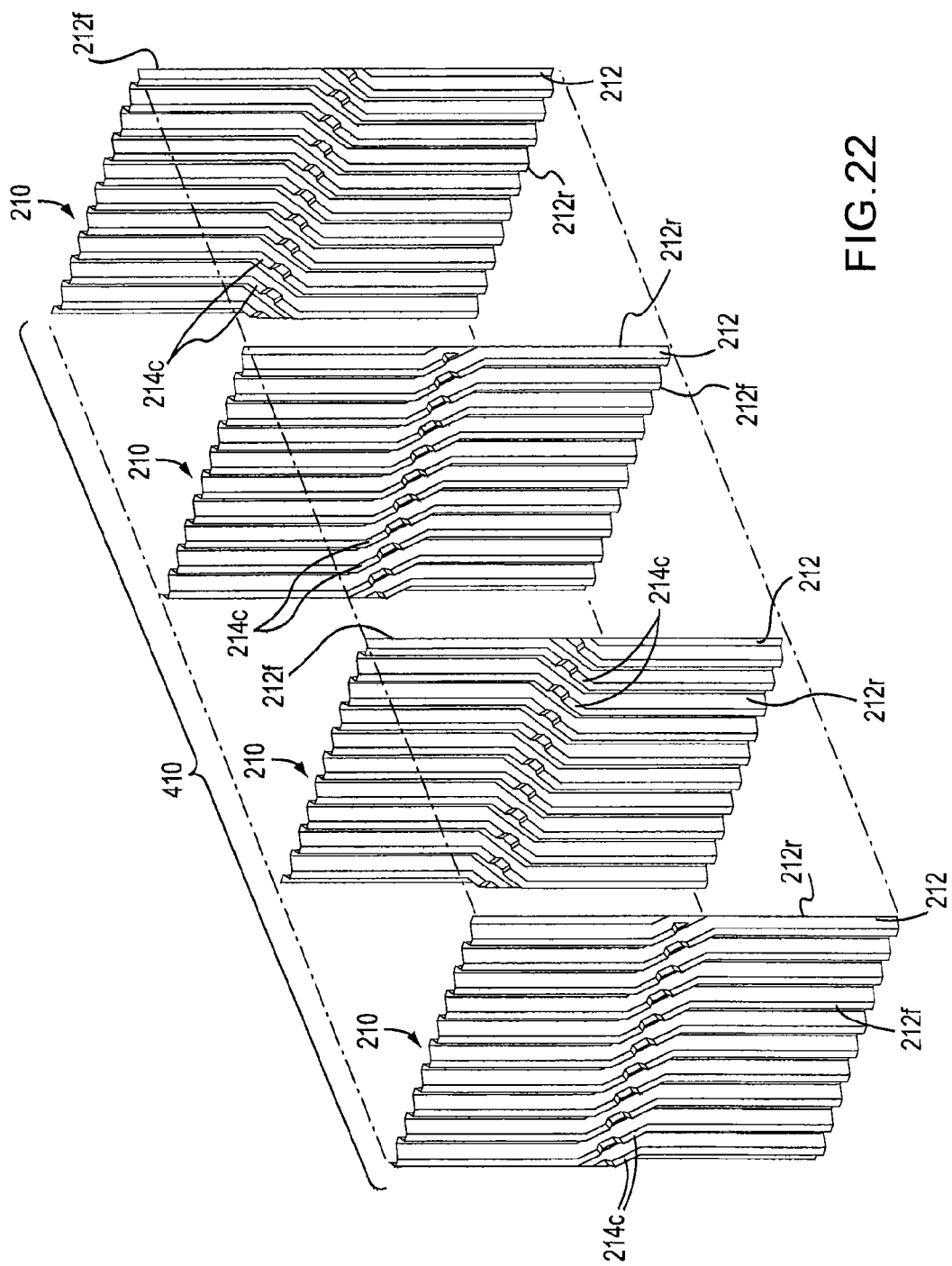
FIG. 22 is an exploded perspective view of a fourth exemplary embodiment of a fill pack of the present invention constructed from a plurality of heat exchanger plates illustrated in FIGS. 14-18.

In FIG. 22, sequential ones of the plurality of corrugated sheets 212 facially oppose each other and connected together in a manner known in the art prior to connecting the plurality of corrugated sheets 212 together. Each corrugated sheet 212 has a front side surface 212f and a rear side surface 212r that is disposed opposite the front side surface 212f.

Figure 23:
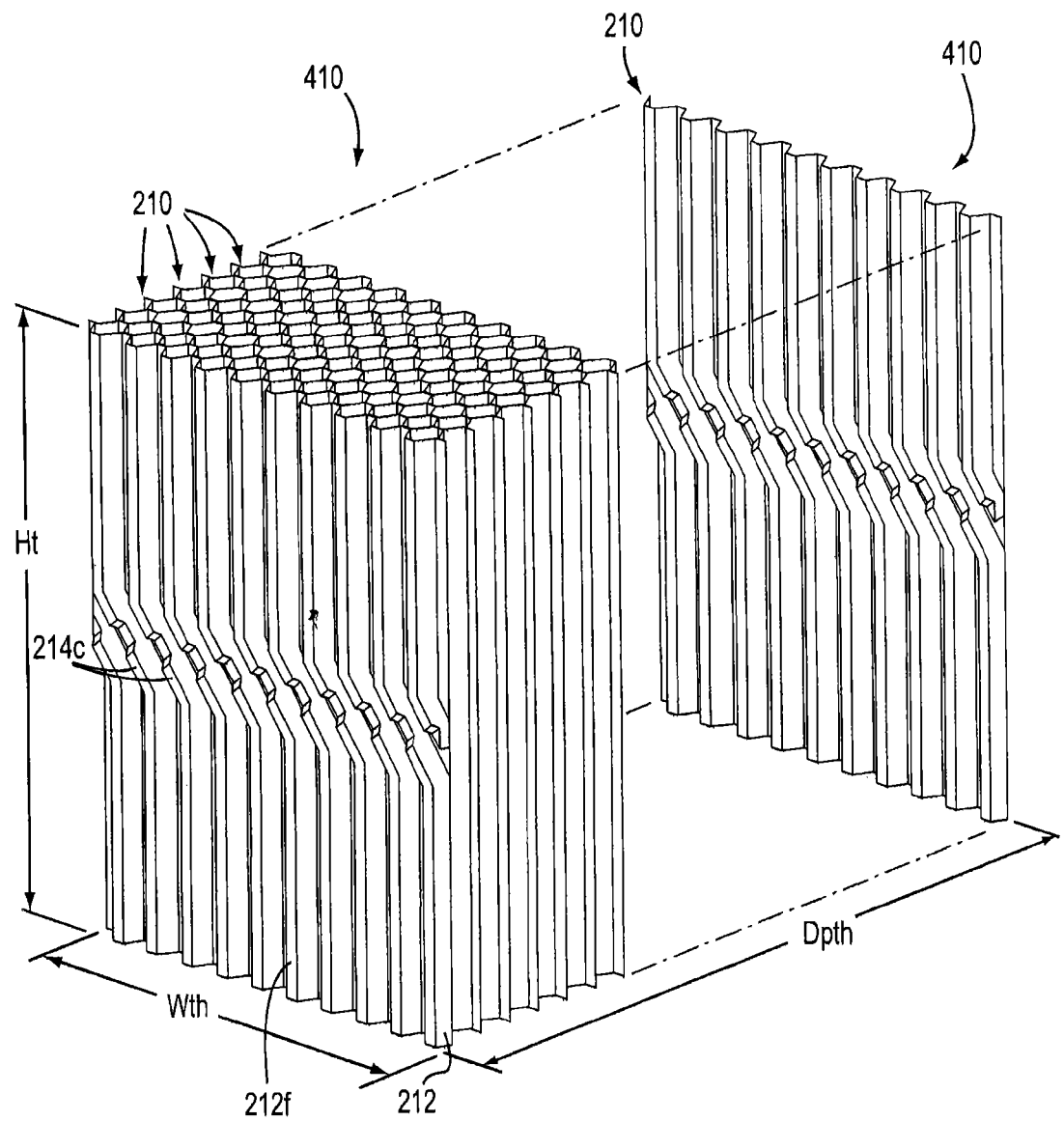
FIG. 23 is a perspective view of the fourth exemplary embodiment of the fill pack of the present invention.
Figure 24:
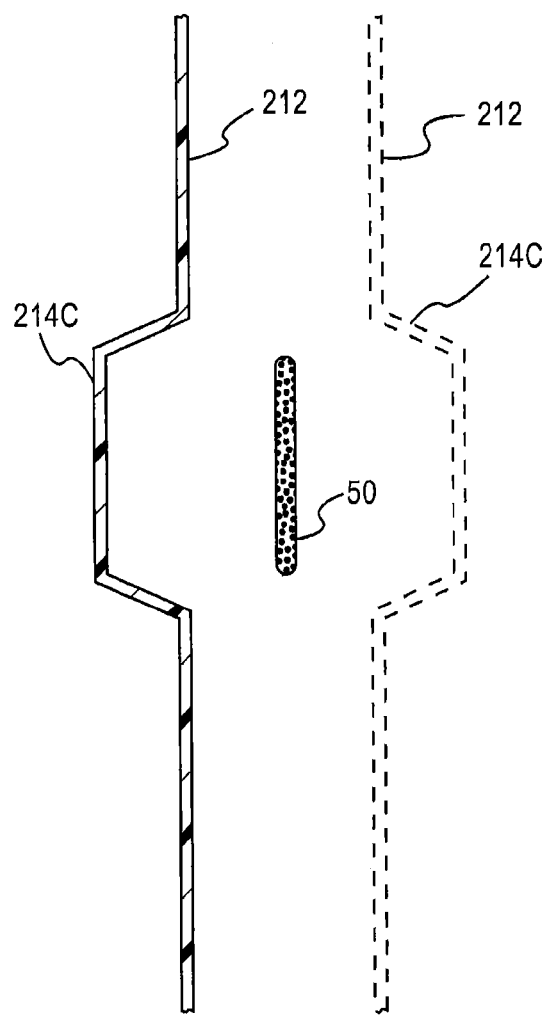
FIG. 24 is an enlarged, partial side elevational view of two opposing heat exchanger plates at the intermediate corrugation segment, one in solid lines and one in dashed lines for clarity of illustration only, separated from one another as illustrated in FIG. 23 before being connected to each other.
Figure 25:
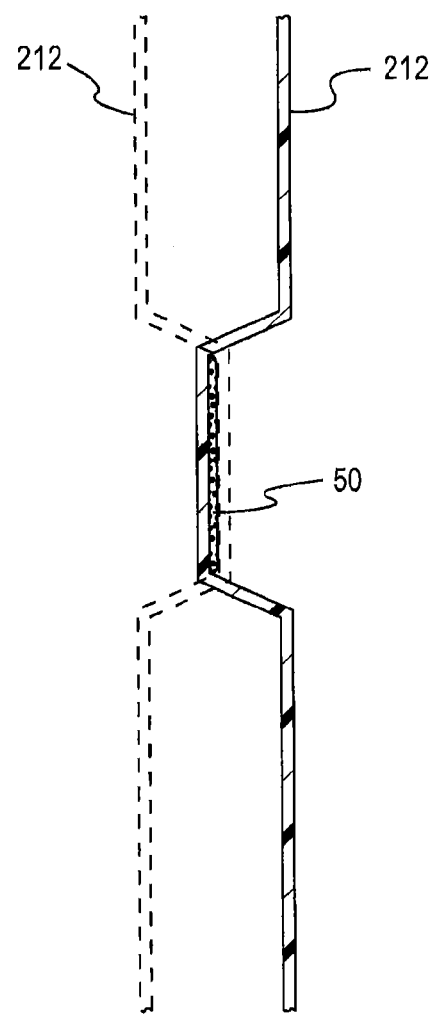
FIG. 25 is an enlarged, partial side elevational view of the two opposing heat exchanger plates in FIG. 24 connected to each other.
Figure 26:
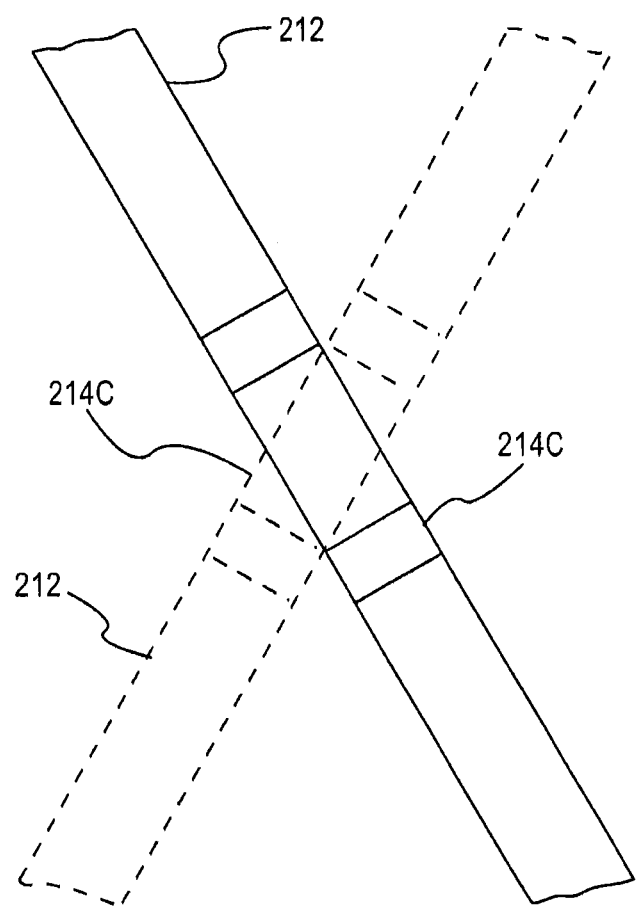
FIG. 26 is an enlarged, partial front elevational view of the two opposing heat exchanger plates, one in solid lines and one in dashed lines for clarity of illustration only, connected to each other as shown in FIG. 25.

In FIGS. 23, 25 and 26, connected ones of the plurality of corrugated sheets 212 are connected in a manner that the front side surfaces 212f are facially opposed to each other while the rear side surfaces 212r are facially opposed to each other as is commonly known in the art. Each one of the intermediate corrugation segments 214c has the recessed surface portion 126 defining the recess 128 and that the connected ones of the plurality of corrugated sheets 212 are received in and connected at respective ones of the recessed surface portions 126 as best shown in FIGS. 25 and 26. The plurality of corrugated sheets 212 are connected together by an adhesive 50 shown in FIGS. 24 and 25. One of ordinary skill in the art would appreciate that the corrugated sheets 212 can be connected together by any conventional means such as by mechanical fasteners or by ultrasonic welding, for example. One of the corrugated sheets 212 in FIGS. 24-26 is drawn by dashed lines for the purpose of clearly illustrating how the corrugated sheets 212 are connected and how the connected corrugated sheets overlap with one another (FIG. 25) with the intermediate corrugation segments 214c crisscrossing (FIG. 26).

Figure 27A:
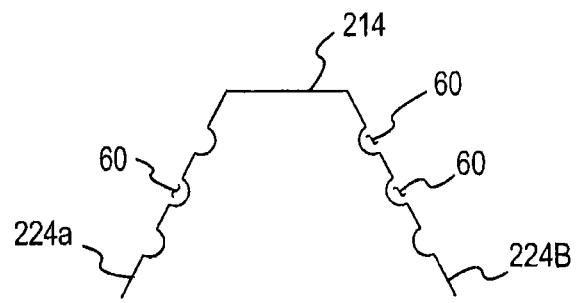
FIGS. 27A-27C are cross-sectional views of three single corrugations illustrating three different exemplary arrangements of textured surfaces thereof.
Figure 27B:
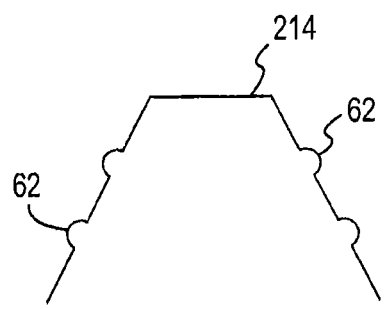
Figure 27C:
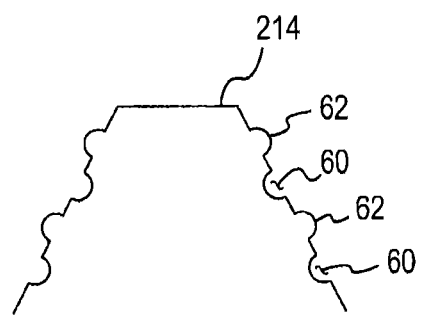

FIGS. 27A-27C are examples of how the first wall piece 224a and the second wall piece 224b of each corrugation 214 can be textured although the entirety of each corrugation described hereinabove can be textured. In FIG. 27A, the first and second wall pieces 224a and 224b are formed with a plurality of grooves 60. In FIG. 27B, the first and second wall pieces 224a and 224b are formed with a plurality of protuberances 62. In FIG. 27C, the first and second wall pieces 224a and 224b are formed with an alternating arrangement of grooves 60 and protuberances 62. One of ordinary skill in the art would appreciate that the grooves 60 and/or the protuberances 62 can be elongated or segmented and other conventional texturing techniques such as dimples of any shape might be used in lieu of or in conjunction with the grooves 60 and/or protuberances 62.

The fourth exemplary embodiment of the fill pack 410 of the present invention was empirically tested and compared with the conventional fill pack 23. As is known in the art, to compare test results of one fill pack to another, the volumetric size of the two fill packs that are being tested must be the same. In FIG. 23, for example, note that the fill pack 410 includes a plurality of heat exchanger plates 210 with each heat exchanger plate 210 having a height Ht and a width Wth and, when the plurality of heat exchanger plates 210 are facially stacked and glued together, the fill pack 410 has a depth Dpth. For testing purposes only, the depth Dpth of the fill pack 410 and the fill pack 23 was arbitrary selected as one foot (1 ft.). Thus, each one of the two different fill packs occupies the same volumetric size for comparative testing purposes. This volumetric size for each one of the fill packs that were empirically tested is calculated as follows: Ht×Wth×Dpth or Ht×Wth×1 ft.

Empirical test results comparing the fill pack 410 of the present invention with the conventional fill pack 23 is shown in Table 1 below.

TABLE 1

| | | | | | | | |
|---|---|---|---|---|---|---|---|
| Inlet Air Temperature | ° F. | 78 | 78 | 78 | 78 | 78 | 78 |
| Cold Water Temperature | ° F. | 83 | 85 | 87 | 83 | 85 | 87 |
| Heat exchanger Height (Ht) | Feet | 4 | 4 | 4 | 6 | 6 | 6 |
| Flow Rate Cooled by Fill Pack 23 | % | 100.0 | 100.0 | 100.0 | 100.0 | 100.0 | 100.0 |
| Flow Rate Cooled by Fill Pack 410 | % | 107.3 | 102.7 | 99.6 | 109.6 | 106.0 | 103.6 |
| Better/Worse | | Better | Better | Worse | Better | Better | Better |

As noted in Table 1, the fill pack 410 of the present invention shows improvement of heat transfer characteristics over the conventional fill pack 23, particularly at low water/high air loading conditions. Furthermore, the depth of the conventional fill pack 23 of one foot required 15 heat exchanger plates 26 while the depth Dpth of the fill pack 410 of the present invention required only 14 heat exchanger plates 210 of the present invention. Thus, not only is the heat transfer characteristics of the present invention improved over the prior art but also such improvement is achieved with one less heat exchanger plate per fill pack. These heat transfer results were unexpected, particularly in light of the fact that the fill pack 410 of the present invention requires a lesser number of heat exchanger plates per unit volume than that of the prior art. Employing the fill pack 410 of the present invention to occupy the same volume in the hyperboloid cooling tower 10 as the conventional fill pack 23 improves heat transfer characteristics, particularly at low water/high air loading conditions, and saves material cost and weight.

Figure 28:
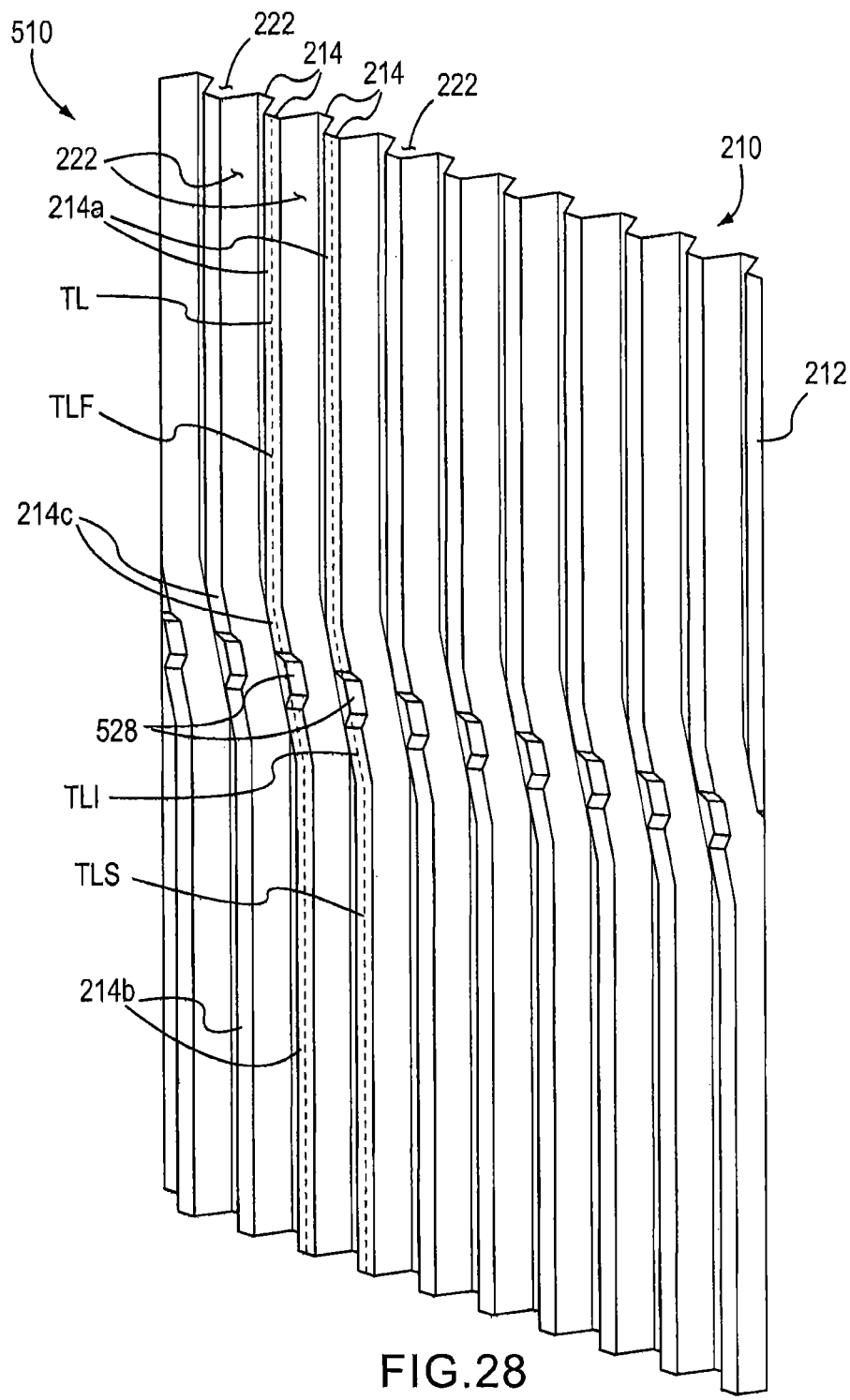
FIG. 28 is a perspective view of a fifth exemplary embodiment of the heat exchanger plate of the present invention.
Figure 29:
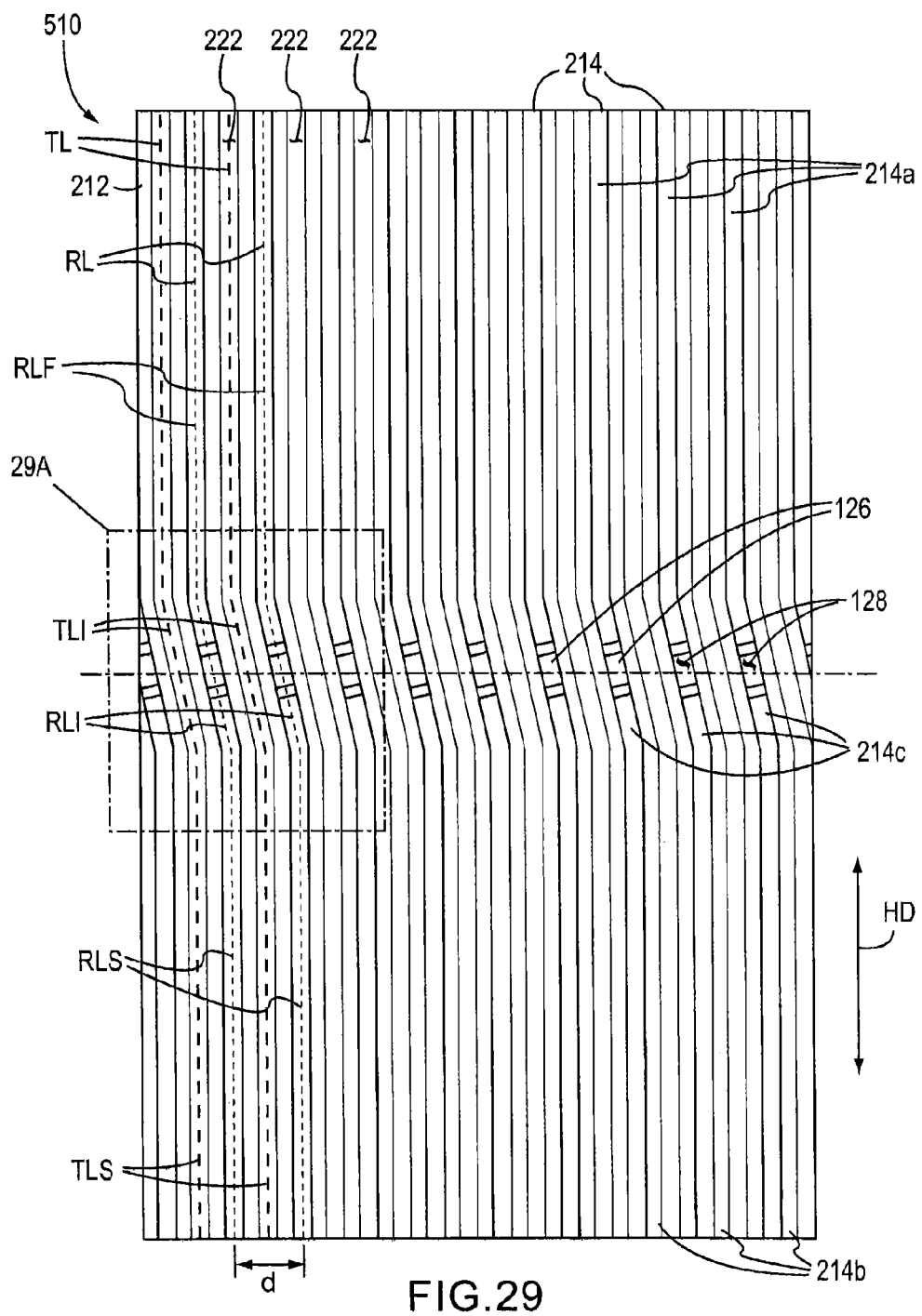
FIG. 29 is a front elevational view of the fifth exemplary embodiment of the heat exchanger plate of the present invention.
Figure 29A:
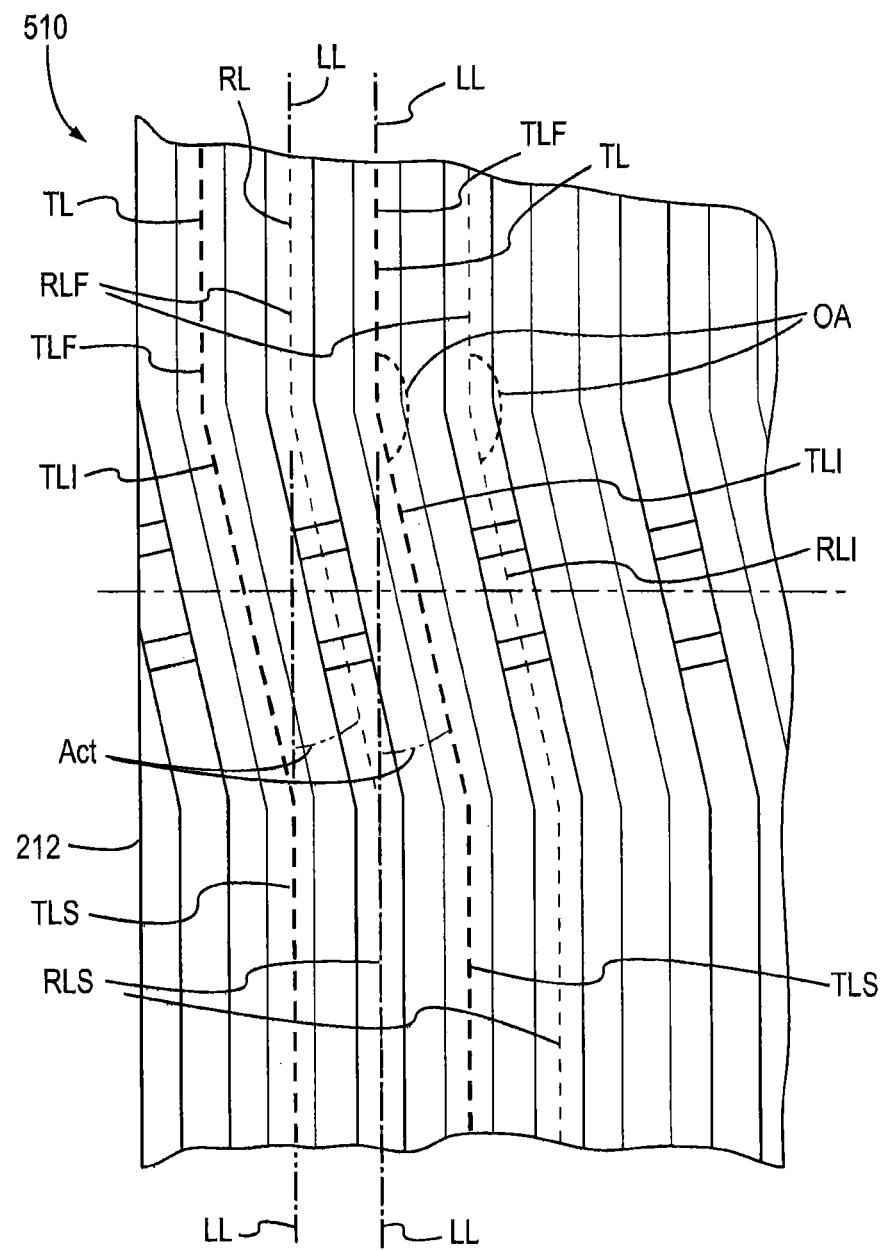
FIG. 29A is an enlarged partial view of the fifth exemplary embodiment of the heat exchanger plate of the present invention taken from dashed box 29A in FIG. 29.
Figure 30:
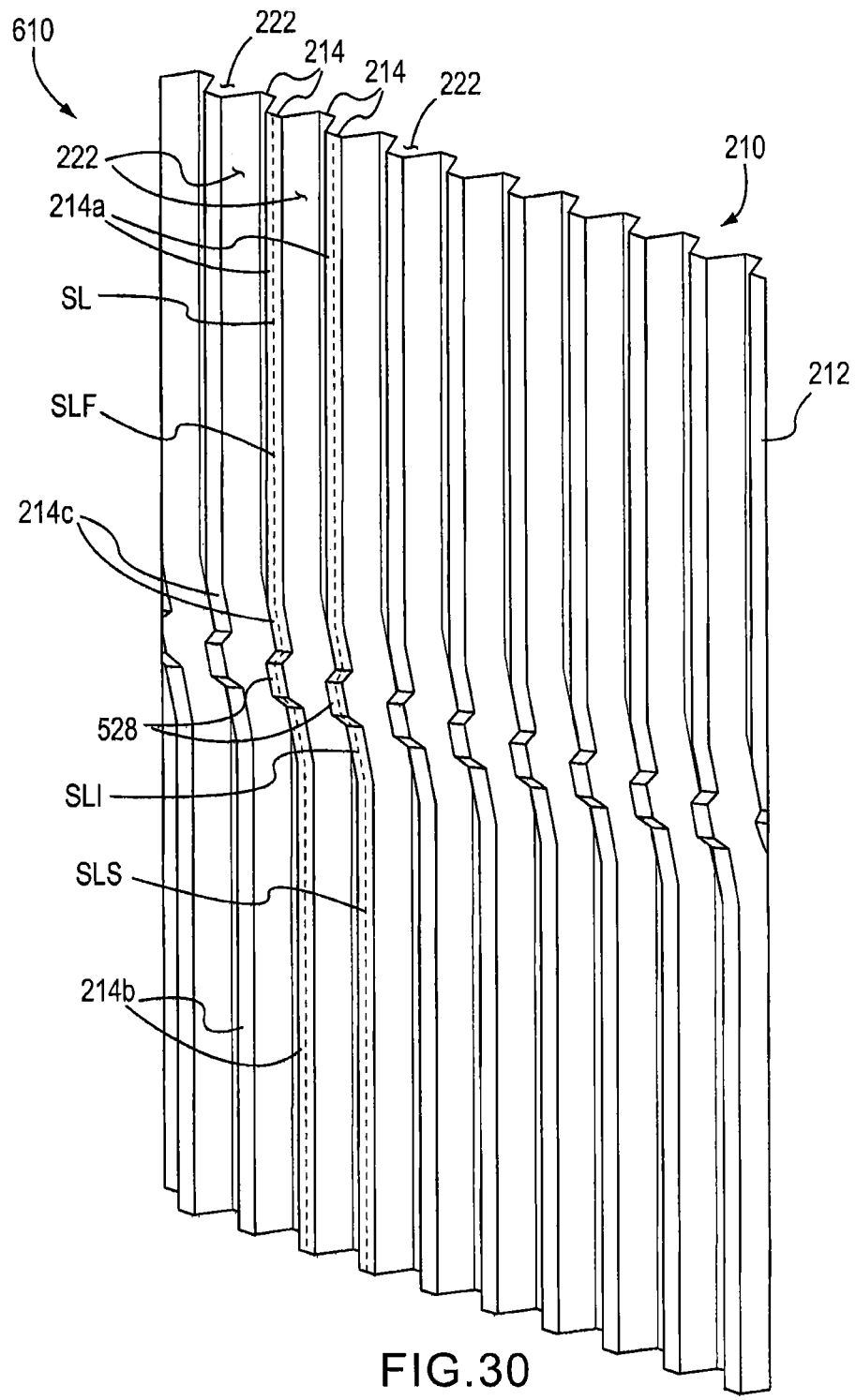
FIG. 30 is a perspective view of a sixth exemplary embodiment of the heat exchanger plate of the present invention.

A fifth exemplary embodiment of a heat exchanger plate 510 of the present invention is depicted in FIGS. 28 and 29. Note that the heat exchanger plate 510 is substantially similar to the heat exchanger plate 210 of the present invention describe above. As best shown in FIG. 29, each one of the repetitive series of flutes 222 extends along an imaginary trough line TL, represented as a thickened dashed line, that extends parallel to the imaginary ridge lines RL. The imaginary trough line TL has a first trough line part TLF, a second trough line part TLS and an intermediate trough line part TLI. The second trough line part TLS extends parallel to and is offset in the widthwise direction from the first trough line part TLF. The intermediate trough line part TLI interconnects the first and second trough line parts TLF and TLS, respectfully, in an oblique manner. As best shown in FIGS. 29 and 29A, relative to the juxtaposed ones of the corrugations 214 and the flutes 222, respective ones of first ridgeline parts RLF and second trough line parts TLS linearly align with each other and respective ones of the second ridgeline parts RLS and the first trough line parts TLF linearly align coextensively with each other along respective imaginary straight lines LL illustrated as alternating dots and dashes. Similar to the imaginary ridgelines RL, the respective imaginary straight lines LL are disposed and extend centrally along respective ones of the flutes 222.

For the fifth exemplary embodiment of the heat exchanger plate 510 of the present invention, it is preferred that the obtuse angle OA is selected from a range of angles between 160° and 168° inclusively. Another way of stating this is that respective ones of the intermediate corrugated segments 214c are preferably oriented at an acute angle ACT in a range of angles to and between 12° and 20° relative to vertical, i.e. in the height-wise direction HD, as best shown in FIG. 29A.

A sixth exemplary embodiment of a heat exchanger plate 610 of the present invention is illustrated in FIGS. 30-35. The sixth exemplary embodiment of the heat exchanger plate 610 is similar to the second exemplary embodiment of the heat exchanger plate 210 of the present invention described above. One difference is that, in lieu of the recess 128 being defined by the recessed surface portion 126 of the second exemplary embodiment 210, each one of the intermediate corrugation segments 214c has a projection 528 that projects outwardly therefrom.

Figure 31:
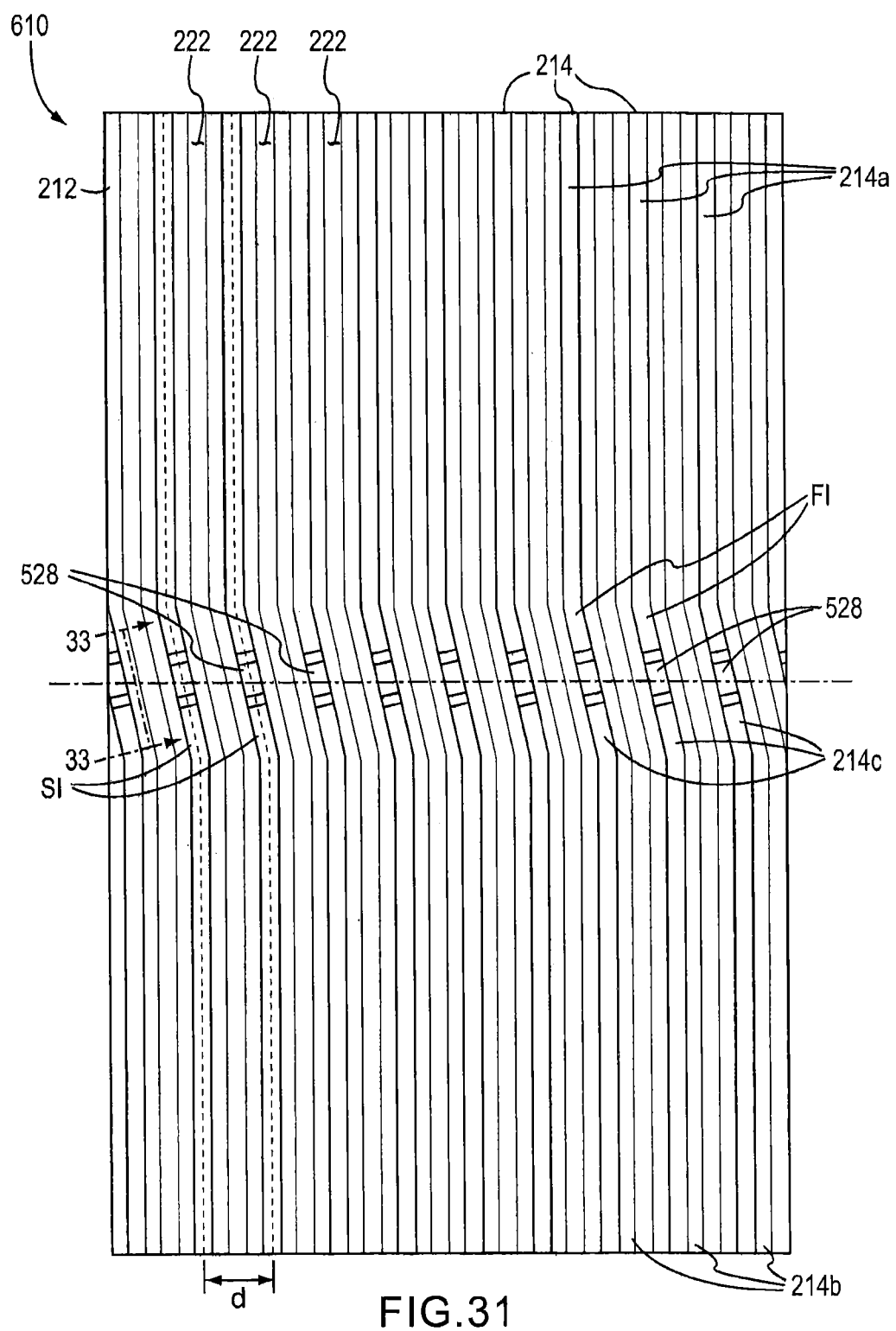
FIG. 31 is a front elevational view of the sixth exemplary embodiment of the heat exchanger plate of the present invention.
Figures 32, 33:
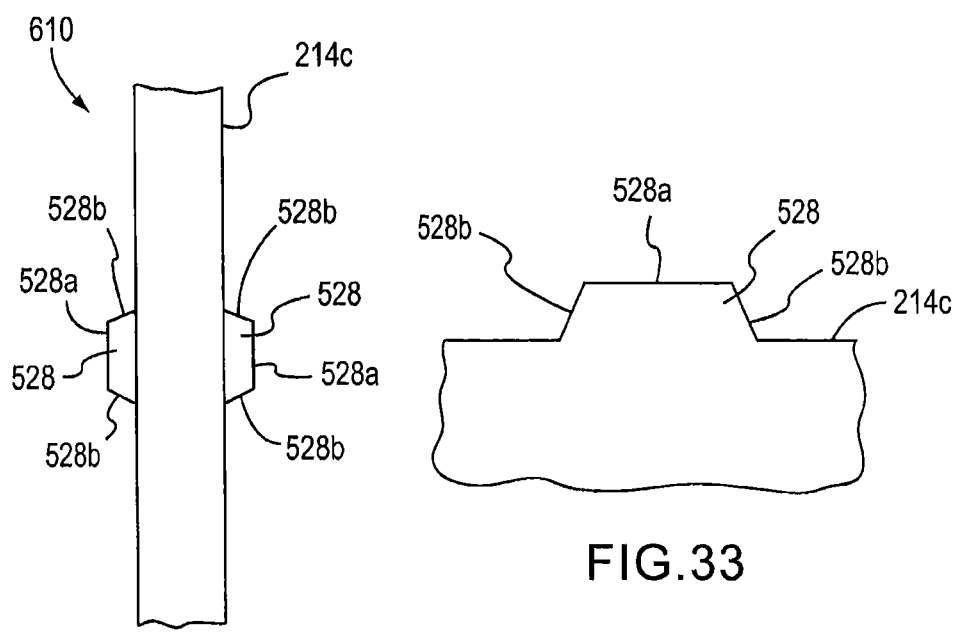
FIG. 32 is a partial side elevational view of the sixth exemplary embodiment of the heat exchanger plate of the present invention.
FIG. 33 is a partial cross-sectional view of the second exemplary embodiment of the heat exchanger plate of the present invention taken along line 33-33 in FIG. 31.
Figure 34:
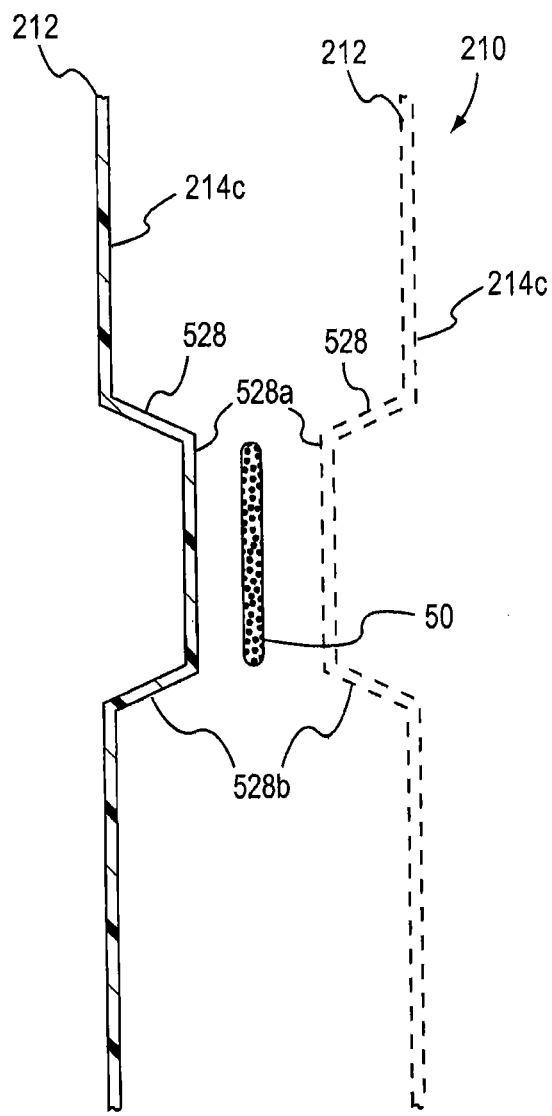
FIG. 34 is an enlarged, partial side elevational view of two opposing heat exchanger plates of FIGS. 30 and 31 at the intermediate corrugation segment, one in solid lines and one in dashed lines for clarity of illustration only, separated from one another.
Figure 35:
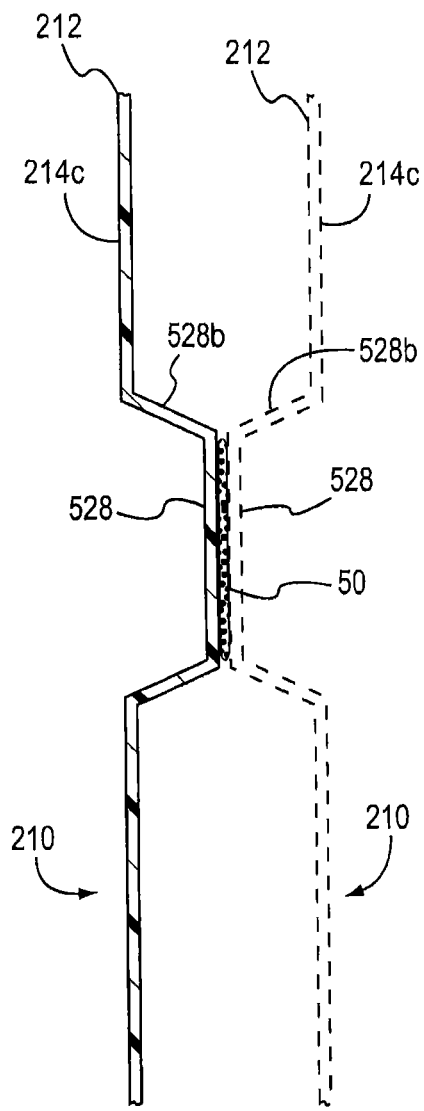
FIG. 35 is an enlarged, partial side elevational view of the two opposing heat exchanger plates in FIG. 34 connected to each other.

As best shown in FIGS. 32-35, each projection 528 has a flat projection surface 528a and a pair of ramp projection surfaces 528b tapering outwardly from the flat projection surface 528 to integrally connect to the intermediate corrugation segment 214c. With reference to FIG. 31, each projection 528 is positioned generally centrally on each intermediate corrugation segment 214c between the first interface FI where the first corrugation segment 214a and the intermediate corrugation segment 214c are connected and the second interface SI where the second corrugation segment 214b and the intermediate corrugation segment 214c are connected. As illustrated by way of example only in FIGS. 34 and 35, two corrugated sheets 212 are connected together at the respective flat projection surfaces 528a by the adhesive 50. For illustration purposes only, one of the corrugated sheets 212 in FIGS. 34-35 is drawn by dashed lines for the purpose of clearly illustrating how the corrugated sheets 212 are connected together.

The present invention, may, however, be embodied in various different forms and should not be construed as limited to the exemplary embodiments set forth herein; rather, these exemplary embodiments are provided so that this disclosure will be thorough and complete and will fully convey the scope of the present invention to those skilled in the art.

What is claimed is:

1. A heat exchanger plate, comprising:
   a corrugated sheet of stiff material configured in a repetitive series of elongated corrugations, each corrugation having a first corrugation segment, a second corrugation segment disposed offset from and extending parallel to the first corrugation segment and an intermediate corrugation segment disposed between and interconnecting the first corrugation segment and the second corrugation segment, the intermediate corrugation segment extending obliquely relative to the first corrugation segment and the second corrugation segment,
   wherein each one of the intermediate corrugation segments extends rectilinearly along an intermediate ridgeline part in an intermediate corrugation segment direction,
   wherein a recess is formed into the intermediate corrugation segment at the intermediate ridgeline part and
   wherein the recess is defined by a flat bottom recess surface, a flat first recess sidewall connected at one end of the flat bottom recess surface and extending therefrom to the intermediate ridgeline part and a flat second recess sidewall connected an opposite end of the flat bottom recess surface and extending therefrom to the intermediate ridgeline part to form a closed recess portion as viewed in side elevation extending along the intermediate corrugation segment direction and an opened recess portion as viewed in side elevation and extending along a transverse direction being perpendicular to the intermediate corrugation segment direction.

2. A heat exchanger plate according to claim 1, wherein the corrugated sheet includes a top edge, a bottom edge disposed apart from and extending parallel to the top edge and a pair of side edges disposed apart from and extending parallel to each other, the pair of side edges connected to and between the top edge and bottom edge to form a generally rectangular configuration.

3. A heat exchanger plate according to claim 2, wherein each one of the first corrugation segments extends vertically from or adjacent the top edge and partially towards the bottom edge, each one of the second corrugation segments extends vertically from or adjacent the bottom edge and partially towards the top edge, respective ones of the first corrugation segments and the second corrugation segments being horizontally offset from one another.

4. A heat exchanger plate according to claim 1, wherein each flat bottom recess surface is positioned generally centrally on the intermediate corrugation segment between a first interface where the first corrugation segment and the intermediate corrugation segment are connected and a second interface where the second corrugation segment and the intermediate corrugation segment are connected.

5. A heat exchanger plate according to claim 1, wherein the repetitive series of elongated corrugations defines a repetitive series of flutes, each one of the repetitive series of elongated corrugations is configured in a V-shape as viewed in planar view and each one of the repetitive series of flutes is configured in a V-shape as viewed in planar view.

6. A heat exchanger plate according to claim 5, wherein each one of the repetitive series of elongated corrugations is integrally connected together in sequence to form a zigzag configuration as viewed in planar view.

7. A heat exchanger plate according to claim 6, wherein each one of the repetitive series of elongated corrugations is formed by a plurality of first wall pieces and a second wall pieces, respective ones of the first wall pieces and the second wall pieces integrally formed together at respective apices.

8. A heat exchanger plate according to claim 1, wherein the repetitive series of elongated corrugations defines a repetitive series of flutes, each one of the repetitive series of elongated corrugations is configured in a truncated V-shaped as viewed in planar view and extends along an imaginary ridgeline having a first ridgeline part, a second ridgeline part extending parallel to and offset in a widthwise direction from the first ridgeline part and an intermediate ridgeline part interconnecting the first and second ridgeline parts in an oblique manner, each one of the repetitive series of flutes is configured in a truncated V-shape as viewed in planar view and extends along an imaginary trough line having a first trough line part, a second trough line part extending parallel to and offset in the widthwise direction from the first trough line part and an intermediate trough line part interconnecting the first and second trough line parts in an oblique manner.

9. A heat exchanger plate according to claim 8, wherein, relative to juxtaposed ones of corrugations and flutes, respective ones of first ridgeline parts and second trough line parts linearly align with each other while respective ones of the second ridgeline parts and the first trough line parts linearly align with each other.

10. A heat exchanger plate according to claim 8, wherein the repetitive series of elongated corrugations forms a truncated zigzag configuration as viewed in planar view.

11. A heat exchanger plate according to claim 10, wherein each one of the repetitive series of elongated corrugations is formed by a first wall piece, a second wall piece disposed apart from the first wall piece and a ridgeline wall piece, the first wall piece and the second wall piece being connected at opposing ends of the ridgeline wall piece and diverging outwardly therefrom.

12. A heat exchanger plate according to claim 11, wherein respective ones of the imaginary corrugation ridgelines extend centrally along respective ones of the ridgeline wall pieces.

13. A heat exchanger plate according to claim 8, wherein each one of the repetitive series of flutes extend centrally along an imaginary valley line.

14. A heat exchanger plate according to claim 1, wherein the first corrugation segment, the second corrugation segment and the intermediate corrugation segment interconnecting the first corrugation segment and the second corrugation segment define an imaginary corrugation ridgeline having a first ridgeline part, a second ridgeline part extending parallel to and offset in a width-wise direction from the first ridgeline part and the intermediate ridgeline part interconnecting and extending at an oblique angle relative to the first ridgeline part and the second ridgeline part.

15. A heat exchanger plate according to claim 14, wherein the oblique angle is selected from a range of angles to and between 150° and 170°.

16. A heat exchanger plate according to claim 14, wherein the oblique angle is selected from a range of angles to and between 160° and 168° inclusively.

17. A heat exchanger plate according to claim 1, wherein, each corrugation has a third corrugation segment and a second intermediate corrugation segment disposed between and interconnecting the second corrugation segment and the third corrugation segment in a continuous, uninterrupted manner, the second intermediate corrugation segment extending obliquely relative to the second corrugation segment and the third corrugation segment, the third corrugation segment extending parallel to the first corrugation segment and second corrugation segment and disposed horizontally offset therefrom in a width-wise direction.

18. A heat exchanger plate according to claim 1, wherein the intermediate corrugation segment interconnects the first corrugation segment and the second corrugation segment in a continuous, uninterrupted manner.

19. A heat exchanger plate according to claim 1, wherein each one of the corrugations is formed as a continuous, uninterrupted offset corrugation.

20. A heat exchanger plate according to claim 1, wherein each one of the intermediate corrugation segments extends along respective ones of intermediate ridgeline parts and a projection projects outwardly from the intermediate corrugation segment.

21. A heat exchanger plate according to claim 20, wherein each projection is positioned generally centrally on the intermediate corrugation segment between a first interface where the first corrugation segment and the intermediate corrugation segment are connected and a second interface where the second corrugation segment and the intermediate corrugation segment are connected.

22. A heat exchanger plate according to claim 1, wherein each corrugation is textured.

23. A fill pack, comprising:
a plurality of corrugated sheets of stiff material, sequential ones of the plurality of corrugated sheets being facially opposed to each other and connected together, each corrugated sheet of stiff material configured in a repetitive series of elongated corrugations and having a front side surface and a rear side surface disposed opposite the front side surface, each corrugation having a first corrugation segment, a second corrugation segment disposed offset from and extending parallel to the first corrugation segment and an intermediate corrugation segment disposed between and interconnecting the first corrugation segment and the second corrugation segment in a continuous, uninterrupted manner, the intermediate corrugation segment extending obliquely relative to the first corrugation segment and the second corrugation segment to form a continuous, uninterrupted offset corrugation,
wherein connected ones of the plurality of corrugated sheets are connected in a manner that the front side surfaces are facially opposed to each other while the rear side surfaces are facially opposed to each other and
wherein each one of the intermediate corrugation segments has an intermediate corrugation segment ridgeline and a recessed surface portion defining a recess located at and formed into the intermediate corrugation segment ridgeline such that the connected ones of the plurality of corrugated sheets are received in facially-opposing ones of the recesses and connected at respective ones of the recessed surface portions.

24. A fill pack according to claim 23, wherein each recessed surface portion is positioned generally centrally on each intermediate corrugation segment between a first interface where the first corrugation segment and the intermediate corrugation segment are connected and a second interface where the second corrugation segment and the intermediate corrugation segment are connected.

25. A fill pack according to claim 23, wherein each one of the intermediate corrugation segments has an intermediate corrugation segment ridgeline and a projection projects outwardly from the intermediate corrugation segment.

26. A fill pack according to claim 25, wherein each projection is positioned generally centrally on each intermediate corrugation segment between a first interface where the first corrugation segment and the intermediate corrugation segment are connected and a second interface where the second corrugation segment and the intermediate corrugation segment are connected.

27. A heat exchanger plate according to claim 1, wherein each one of the flat first recess sidewall and the flat second recess sidewall projects from the flat bottom recess surface at an obtuse angle relative to the flat bottom recess surface.

* * * * *